(12) United States Patent
Schechter et al.

(10) Patent No.: US 10,704,960 B2
(45) Date of Patent: Jul. 7, 2020

(54) LOW-POWER USER INTERFACE DEVICE FOR ENVIRONMENTAL MONITORING SYSTEM

(71) Applicant: Digi International, Inc., Minnetonka, MN (US)

(72) Inventors: Harry J. Schechter, Needham, MA (US); Jeremy V. Macdonald, Boston, MA (US); Diane Deng, Randolph, MA (US); Kyle W. Gilpin, Anchorage, AK (US)

(73) Assignee: Digi International, Inc., Minnetonka, MN (US)

( * ) Notice: Subject to any disclaimer, the term of this patent is extended or adjusted under 35 U.S.C. 154(b) by 0 days.

(21) Appl. No.: 15/830,938

(22) Filed: Dec. 4, 2017

(65) Prior Publication Data
US 2018/0087970 A1    Mar. 29, 2018

Related U.S. Application Data

(63) Continuation of application No. 14/966,074, filed on Dec. 11, 2015, now Pat. No. 9,857,233, which is a
(Continued)

(51) Int. Cl.
*G01K 1/02* (2006.01)
*H04Q 9/00* (2006.01)

(52) U.S. Cl.
CPC ............... *G01K 1/024* (2013.01); *H04Q 9/00* (2013.01); *H04Q 2209/40* (2013.01); *H04Q 2209/43* (2013.01)

(58) Field of Classification Search
CPC ..... H04W 64/00; H04Q 9/00; H04Q 2209/40; H04Q 2209/43; G01K 1/024; A61B 5/0004; A61B 5/14532
See application file for complete search history.

(56) References Cited

U.S. PATENT DOCUMENTS 3,690,175 A    9/1972  Butts
4,003,124 A    1/1977  Connick
(Continued)

OTHER PUBLICATIONS

Abbasi et al., "A survey on clustering algorithms for wireless sensor networks," Computer Communications 30, published 2007, pp. 2826-2841.
(Continued)

*Primary Examiner* — Orlando Bousono
(74) *Attorney, Agent, or Firm* — Wolf, Greenfield & Sacks, P.C.

(57) ABSTRACT

Embodiments of an environmental monitoring system that mitigates complexities in installation and maintenance while complying with strict regulations on operations of the system. The environmental monitoring system may communicate wirelessly between components such as sensor units and display devices, enabling these components to be separately and easily installed in an environment without needing to install wires in the environment to connect them. In addition, in embodiments at least some of the components (e.g., sensor units and display devices) of the environmental monitoring system may be adapted to wirelessly and reliably communicate using specific wireless communication protocols, described in detail herein, that exchange few communications between the components and thereby decrease power consumption of these components. Further, in some embodiments, a display device may include hardware and/or execute software that drive and/or update a display only when a condition is met.

26 Claims, 11 Drawing Sheets

Related U.S. Application Data continuation of application No. 14/726,135, filed on May 29, 2015, now Pat. No. 9,247,322.

(56) References Cited

U.S. PATENT DOCUMENTS

| | | | |
|---|---|---|---|
| 4,293,916 A | 10/1981 | Del Re et al. |
| 4,468,135 A | 8/1984 | McCain et al. |
| 5,355,686 A | 10/1994 | Weiss |
| 5,854,994 A | 12/1998 | Canada et al. |
| 5,892,441 A | 4/1999 | Woolley et al. |
| 5,982,291 A | 11/1999 | Williams et al. |
| 6,112,246 A | 8/2000 | Horbal et al. |
| 6,255,942 B1 | 7/2001 | Knudsen |
| 6,502,409 B1 | 1/2003 | Gatling et al. |
| 6,553,336 B1 | 4/2003 | Johnson et al. |
| 6,646,564 B1 | 11/2003 | Azieres et al. |
| 6,740,033 B1 | 5/2004 | Olejniczak et al. |
| 6,741,174 B2 | 5/2004 | Rhoades et al. |
| 6,817,757 B1 | 11/2004 | Wallace |
| 6,976,368 B1 | 12/2005 | Lamstaes et al. |
| 7,026,929 B1 | 4/2006 | Wallace |
| 7,191,097 B1 | 3/2007 | Lee et al. |
| 7,299,068 B1 | 11/2007 | Halla et al. |
| 7,342,504 B2 | 3/2008 | Crane et al. |
| 7,456,736 B2 | 11/2008 | Primm et al. |
| 7,483,805 B2 | 1/2009 | Sparks et al. |
| 7,688,952 B2 | 3/2010 | Light et al. |
| 7,762,470 B2 | 7/2010 | Finn et al. |
| 7,822,387 B2 | 10/2010 | Gross |
| 7,902,975 B2 | 3/2011 | Glenn et al. |
| 7,952,485 B2 | 5/2011 | Schechter et al. |
| 8,099,130 B1 | 1/2012 | Halla et al. |
| 8,181,113 B2 | 5/2012 | Abbott et al. |
| 8,228,183 B2 | 7/2012 | Glenn et al. |
| 8,248,252 B2 | 8/2012 | Schechter et al. |
| 8,547,226 B2 | 10/2013 | Schechter et al. |
| 8,599,012 B2 | 12/2013 | Schechter et al. |
| 8,779,926 B2 | 7/2014 | Schechter |
| 9,092,967 B2 | 7/2015 | Schechter |
| 9,247,322 B1 | 1/2016 | Schechter et al. |
| 9,500,532 B2 | 11/2016 | Schechter et al. |
| 9,541,454 B2 | 1/2017 | Schechter et al. |
| 9,857,233 B2 | 1/2018 | Schechter et al. |
| 2001/0044588 A1 | 11/2001 | Mault |
| 2002/0161624 A1 | 10/2002 | Bradlee |
| 2003/0149526 A1 | 8/2003 | Zhou et al. |
| 2004/0090345 A1 | 5/2004 | Hitt |
| 2004/0133379 A1 | 7/2004 | Kobayashi et al. |
| 2004/0226392 A1 | 11/2004 | McNally |
| 2005/0250440 A1 | 11/2005 | Zhou et al. |
| 2006/0028335 A1 | 2/2006 | Glenn et al. |
| 2006/0049961 A1 | 3/2006 | Deck et al. |
| 2006/0071784 A1 | 4/2006 | Frank |
| 2006/0087428 A1 | 4/2006 | Wolfe et al. |
| 2006/0186197 A1 | 8/2006 | Rosenberg |
| 2006/0202805 A1 | 9/2006 | Schulman et al. |
| 2006/0218057 A1 | 9/2006 | Fitzpatrick et al. |
| 2006/0271695 A1 | 11/2006 | Lavian |
| 2007/0005245 A1 | 1/2007 | Ellis |
| 2007/0006604 A1 | 1/2007 | Behr |
| 2007/0019641 A1 | 1/2007 | Pai et al. |
| 2007/0177439 A1 | 8/2007 | Saito et al. |
| 2007/0273557 A1 | 11/2007 | Baillot |
| 2007/0287477 A1 | 12/2007 | Tran |
| 2008/0042901 A1 | 2/2008 | Smith et al. |
| 2008/0048914 A1 | 2/2008 | Smith et al. |
| 2008/0052044 A1 | 2/2008 | Shoenfield |
| 2008/0055158 A1 | 3/2008 | Smith et al. |
| 2008/0056261 A1 | 3/2008 | Osborn et al. |
| 2008/0084294 A1 | 4/2008 | Zhiying et al. |
| 2008/0155064 A1 | 6/2008 | Kosuge et al. |
| 2008/0176539 A1 | 7/2008 | Staton et al. |
| 2008/0186166 A1 | 8/2008 | Zhou et al. |
| 2009/0270689 A1 | 10/2009 | Galland |
| 2009/0273470 A1 | 11/2009 | Sinkevicius et al. |
| 2009/0278951 A1 | 11/2009 | Loose et al. |
| 2009/0282715 A1 | 11/2009 | Pemberton |
| 2009/0283603 A1 | 11/2009 | Peterson et al. |
| 2010/0052991 A1 | 3/2010 | Smith et al. |
| 2010/0127880 A1 | 5/2010 | Schechter et al. |
| 2010/0127881 A1 | 5/2010 | Schechter et al. |
| 2010/0150122 A1 | 6/2010 | Berger et al. |
| 2010/0210919 A1 | 8/2010 | Ariav et al. |
| 2010/0241277 A1 | 9/2010 | Humphrey |
| 2010/0312881 A1 | 12/2010 | Davis et al. |
| 2011/0060571 A1 | 3/2011 | Ueda |
| 2011/0115640 A1 | 5/2011 | Jiang et al. |
| 2011/0205033 A1 | 8/2011 | Bandyopadhyay et al. |
| 2012/0041604 A1 | 2/2012 | Isaksson et al. |
| 2012/0078723 A1 | 3/2012 | Stewart |
| 2012/0099579 A1 | 4/2012 | Kim et al. |
| 2012/0143383 A1 | 6/2012 | Cooperrider et al. |
| 2012/0280834 A1 | 11/2012 | Schechter et al. |
| 2012/0286969 A1 | 11/2012 | Schechter et al. |
| 2013/0147630 A1 | 6/2013 | Nakaya et al. |
| 2013/0157637 A1 | 6/2013 | Bos |
| 2013/0169443 A1 | 7/2013 | Schechter |
| 2013/0311140 A1 | 11/2013 | Schechter |
| 2013/0346125 A1 | 12/2013 | Grant et al. |
| 2014/0028457 A1 | 1/2014 | Reinpoldt et al. |
| 2014/0033759 A1 | 2/2014 | Ide et al. |
| 2014/0053586 A1 | 2/2014 | Poecher et al. |
| 2014/0107993 A1 | 4/2014 | Cheng |
| 2014/0170967 A1 | 6/2014 | Chateau et al. |
| 2014/0232556 A1 | 8/2014 | Williams |
| 2014/0278332 A1 | 9/2014 | Grammatikakis et al. |
| 2014/0375274 A1 | 12/2014 | Tsai et al. |
| 2015/0029025 A1 | 1/2015 | Kore et al. |
| 2015/0116127 A1 | 4/2015 | Lynch et al. |
| 2015/0120336 A1 | 4/2015 | Grokop et al. |
| 2015/0123810 A1 | 5/2015 | Hernandez-Rosas et al. |
| 2015/0123811 A1 | 5/2015 | Hernandez-Rosas |
| 2015/0123812 A1 | 5/2015 | Hernandez-Rosas |
| 2015/0123813 A1 | 5/2015 | Hernandez-Rosas |
| 2016/0349116 A1 | 12/2016 | Schechter et al. |

OTHER PUBLICATIONS http://www.bapihvac.com/CatalogPDFs/1 App Notes/Thermal Buffer Temp Sensing.pdf, Rev. Mar. 3, 2008, downloaded May 1, 2014.

Cryolog, Traceo product literature, http://www.cryolog.com/en/pages/products_and_services/traceo/index.php, p. 1, 2007, downloaded Oct. 23, 2008.

http://www.dicksondata.com/products/WFT21, downloaded May 1, 2014.

EasyLog USB Data Logger product literature, http://www.lascarelectronics.com/temperaturedatalogger.php?datalogger=102, p. 1, downloaded Oct. 23, 2008.

http://www.fishersci.com/ecomm/servlet/itemdetail?catnum=NC0278993&storeid=10652, copyright 2014, downloaded May 1, 2014.

iButtonLink Temperature Monitor product literature, http://www.ibuttonlink.com/1-wire-interface-masters.aspx, pp. 1-2, downloaded Oct. 23, 2008.

IT Watchdogs WeatherDuck product literature, http://www.itwatchdogs.com/duckdetails.shtml, p. 1, 2002-2005, downloaded Oct. 23, 2008.

http://www.kele.com/temperature-sensors-and-transmitters/as10-series.aspx, downloaded May 1, 2014.

http://www.prweb.com/releases/refrigeration/efficiency/prweb10684359.htm, downloaded May 1, 2014.

Savvides et al., "The Bits and Flops of the N-hop Multilateration Primitive for Node Localization Problems," WSNA'02, Sep. 28, 2002, Atlanta, Georgia.

Sugano et al., "Indoor Localization System Using RSSI Measurement of Wireless Sensor network Based on Zigbee Standard", Wireless and Optical Communications, 2006, pp. 1-6.

http://temprotect.com/action/shop/viewitem/?itemType=72&name=Glycol%20Buffer%20Vial, downloaded Jul. 9, 2014.

THUM—Temperature Humidity USB Monitor product literature, Practical Design Group, LLC, http://practsol.com/thum.htm, pp. 1-2, 2004-2008, downloaded Oct. 23, 2008.

(56) References Cited

OTHER PUBLICATIONS http://www.thermcoproductsinc.com/vaccine-thermometers.html, downloaded May 1, 2014.
USB Tenki: USB Temperature sensors and more product literature, http://www.raphnet.net/electronique/usbtenki/index_en.php, pp. 1-8, 2002-2008, downloaded Oct. 23, 2008.
http://www.vfcdataloggers.com/probevial-1.aspx, Copyright 2014 Dataloggers, downloaded May 1, 2014.
Younis et al., "Distributed Clustering in Ad-hoc Sensor Networks: A Hybrid, Energy-Efficient Approach," in Proceedings of IEEE INFOCOM, vol. 1, pp. 629-640, Mar. 2004.
Zanca et al., "Experimental comparison of RSSI-based localization algorithms for indoor wireless sensor networks," REALWSN'08, Apr. 1, 2008, Glasgow, United Kingdom.
Zhao et al., "Wireless Sensor Networks, An Information Processing Approach," Morgan Kaufmann Publishers, 2004, pp. 117-131.
"ZigBee—Wikipedia, the free encyclopedia," available at http:/en.wikipedia.org/wiki/Zigbee, retrieved Dec. 23, 2011.
U.S. Appl. No. 14/799,668, filed Jul. 15, 2015, Schechter.
U.S. Appl. No. 13/474,372, filed May 17, 2012, Schechter.
U.S. Appl. No. 14/529,040, filed Oct. 30, 2014, Schechter.

LOW-POWER USER INTERFACE DEVICE FOR ENVIRONMENTAL MONITORING SYSTEM

RELATED APPLICATIONS

The present application is a continuation of and claims the benefit under 35 U.S.C. § 120 of U.S. patent application Ser. No. 14/966,074, entitled "Low-Power User Interface Device for Environmental Monitoring System," filed in the U.S. Patent and Trademark Office on Dec. 11, 2015, which is a continuation of and claims the benefit under 35 U.S.C. § 120 of U.S. patent application Ser. No. 14/726,135, entitled "Low-Power User Interface Device for Environmental Monitoring System," filed in the U.S. Patent and Trademark Office on May 29, 2015, now U.S. Pat. No. 9,247,322, the entire contents of each of which are incorporated herein by reference.

BACKGROUND

Temperature monitoring is used in many industries. For example, restaurants and food processing companies that rely on refrigeration equipment to keep their products fresh frequently use temperature monitoring. If a malfunction of the refrigeration equipment is not detected promptly, food products could become too hot or too cold, resulting in spoilage or other damage to the food products. For a business that relies on food, such damage could result in a large monetary loss and potentially a serious business disruption.

Temperature monitoring systems are known. These systems incorporate temperature sensors attached to or mounted near equipment for which temperature is to be monitored. The system responds if the temperature sensor indicates a temperature outside of a normal operating range. One type of response that has been used is to raise an alarm at a facility where the monitored equipment is located. Some systems use bells, flashing lights or other forms of audible or visible indications of an improper operating temperature.

SUMMARY

In one embodiment, there is provided an apparatus for use with an environmental monitoring system to monitor one or more environmental parameters of an environment, the environmental monitoring system comprising the apparatus, at least one environmental sensor unit to sense the one or more environmental parameters, and at least one computing device located remote from the environment. The apparatus comprises a display, a wireless receiver, at least one processor, and at least one storage medium having encoded thereon executable instructions that, when executed by the at least one processor, cause the at least one processor to carry out a method. The method comprises, in response to detecting that a first period of time has passed, monitoring, using the wireless receiver, for a wireless transmission comprising a device identifier of a first environmental sensor unit, of the at least one environmental sensor unit, with which the apparatus is associated. The method further comprises, in response to detecting that a first period of time has passed, and further in response to receiving the wireless transmission comprising the device identifier for the first environmental sensor unit, determining from the wireless transmission a value of an environmental parameter of the one or more environmental parameters, and controlling the display to present information indicative of the value of the environmental parameter. The display may be an electronic paper display. The electronic paper display may be an electrophoretic display. The wireless receiver may be a wireless personal area network (WPAN) receiver. Monitoring for the wireless transmission may comprise monitoring for a wireless transmission transmitted according to a stateless communication protocol.

In another embodiment, there is provided An environmental monitoring system for monitoring one or more environmental parameters of an environment. The environmental monitoring system comprises at least one computing device located remote from the environment, a first environmental sensor unit located in the environment, and a display device located in the environment. The first environmental sensor unit comprises at least one environmental sensor, at least one wireless transceiver, at least one first processor, and at least one first storage medium having encoded thereon executable instructions that, when executed by the at least one first processor, cause the at least one first processor to carry out a first method. The first method comprises, in response to detecting a value of an environmental parameter via the at least one environmental sensor, transmitting the value to the at least one computing device via the at least one wireless transceiver, and in response to receiving from the at least one computing device a message indicating that the value of the environmental parameter satisfies an alert condition, transmitting, to the display device and via the at least one wireless transceiver, at least one message comprising the value and indicating the alert. The display device comprises a display, a wireless receiver, at least one second processor, and at least one second storage medium having encoded thereon executable instructions that, when executed by the at least one second processor, cause the at least one first processor to carry out a second method. The second method comprises, in response to receiving at least one message from the first environmental sensor unit, determining whether the at least one message indicates an alert. The second method further comprises, in response to receiving at least one message from the first environmental sensor unit, and further in response to determining that the at least one message indicates the alert, updating the display to output the value and the alert. The second method further comprises, in response to receiving at least one message from the first environmental sensor unit, and further in response to determining that the at least one message does not indicate the alert, updating the display to output the value. The display device may be associated with the first environmental sensor. Receiving the at least one message from the first environmental sensor unit may comprise monitoring, using the wireless receiver, for a wireless transmission comprising a device identifier of the first environmental sensor unit and further comprising an indication that the wireless transmission is a broadcast transmission.

In a further embodiment, there is provided an apparatus for use with an environmental monitoring system to monitor one or more environmental parameters of an environment. The environmental monitoring system comprises the apparatus, a display device, and at least one computing device located remote from the environment. The apparatus comprises at least one environmental sensor, at least one wireless transceiver, at least one processor, and at least one storage medium having encoded thereon executable instructions that, when executed by the at least one first processor, cause the at least one first processor to carry out a method. The method comprises, in response to detecting a value of an environmental parameter via the at least one environmental sensor, transmitting the value to the at least one computing device via the at least one wireless transceiver, and, in response to receiving from the at least one computing device a message indicating that the value of the environmental parameter satisfies an alert condition, transmitting, to the display device and via the at least one wireless transceiver, at least one message comprising the value and indicating the alert.

In another embodiment, there is provided a method of communicating between a display device and at least one environmental sensor unit of an environmental monitoring system arranged to monitor one or more environmental parameters of an environment. The display device comprises a display and a wireless receiver and is associated with a first environmental sensor unit of the at least one environmental sensor unit. The method comprises, in response to detecting that a first period of time has passed, monitoring, using the wireless receiver, for a wireless transmission comprising a device identifier of a first environmental sensor unit, of the at least one environmental sensor unit, with which the apparatus is associated. The method further comprises, in response to detecting that a first period of time has passed, and further in response to receiving the wireless transmission comprising the device identifier for the first environmental sensor unit, determining from the wireless transmission a value of an environmental parameter of the one or more environmental parameters, and controlling the display to present information indicative of the value of the environmental parameter.

In a further embodiment, there is provided a method of associating a display device with an environmental sensor unit of an environmental monitoring system arranged to monitor one or more environmental parameters of an environment. The display device comprises a display and a wireless receiver. The method comprises, in response to satisfaction of a condition, monitoring, via the wireless receiver, for broadcast wireless transmissions from at least one environmental sensor unit in the environment. The method further comprises associating the display device with one of the at least one environmental sensor unit from which a wireless transmission is first received following start of the monitoring for wireless transmissions, when the wireless transmission that is first received comprises an indication that the wireless transmission is a broadcast transmission and comprising a device identifier for the one. The associating comprises storing the device identifier for the one in the at least one storage medium. The monitoring in response to satisfaction of a condition may further comprise monitoring in response to receipt of an instruction from a user to establish an association.

In another embodiment, there is provided a system comprising a refrigeration device comprising a chamber that is cooled to a temperature lower than that of an environment in which the refrigeration device is positioned and a display device positioned outside of the refrigeration device in the surrounding environment. The display device comprises a display, a first wireless transceiver, and at least one first control circuit to receive a first temperature value received wirelessly by the first wireless transceiver and to operate the display to display the first temperature value. The system further comprises a sensor device positioned in the chamber of the refrigeration unit. The sensor device comprises a temperature sensor, at least one second wireless transceiver, and at least one second control circuit to receive a second value indicating a temperature sensed by the sensor unit and to operate the at least one second wireless transceiver to wirelessly transmit to the display device the second value of the temperature.

In a further embodiment, there is provided a system comprising a refrigeration device comprising a chamber that is cooled to a first temperature lower than a second temperature of the surrounding environment and a monitoring system to monitor over time whether the refrigeration device is operating in accordance with a regulation governing storage of temperature-sensitive goods and identify one or more acceptable temperatures at which the temperature-sensitive goods are to be stored. The regulation requiring persistent logging of temperatures detected in the refrigeration device at intervals over a period of time. The monitoring system comprises a display device disposed outside of the refrigeration device in the surrounding environment. The display device comprises a display, a first wireless transceiver, and at least one first control circuit to receive a first temperature value received wirelessly by the first wireless transceiver and to operate the display to display the first temperature value. The monitoring system further comprises a sensor device disposed in the chamber of the refrigeration device. The sensor device comprises a temperature sensor, a second wireless transceiver, and at least one second control circuit to receive a second value indicating a temperature sensed by the sensor unit and to operate the second wireless transceiver to wirelessly transmit to the display device the second value of the temperature. The refrigeration device may be a freezer. The monitoring system may monitor over time whether the refrigeration device is operating in accordance with a regulation governing storage of food and/or beverages. The monitoring system may monitor over time whether the refrigeration device is operating in accordance with a regulation governing storage of pharmaceuticals. The monitoring system may be configured to output an alert in response to determining that the temperature in the chamber of the refrigeration device deviates from an acceptable temperature identified by the regulation, and the monitoring system may be configured to output the alert at least via the display device. The monitoring system may further comprise a server disposed remote from the refrigeration device and communicating with the sensor device via the Internet, and the server may be configured to receive one or more temperature values wirelessly transmitted by the at least one second wireless transceiver of the sensor device and to transmit, in response to determining, based on the one or more temperature values, that the one or more temperature values indicate that the temperature in the chamber of the refrigeration device has deviated from an acceptable temperature identified by the regulation, an alert to be displayed on the display device. The server may be configured to transmit the alert to be displayed on the display device by transmitting the alert to the sensor device for communication to the display device. The at least one second wireless transceiver of the sensor device may comprise a first local wireless transceiver and a second wide-area wireless transceiver, with the second wide-area wireless transceiver having a greater transmission range than the first local wireless transceiver, the at least one second control circuit of the sensor device may be configured to wirelessly transmit to the display device the second value of the temperature via the first local wireless transceiver, and the at least one second control circuit may be further configured to receive the alert, transmitted by the server, via the second wide-area wireless transceiver and to transmit the alert to the display device via the first local wireless transceiver.

In another embodiment, there is provided a monitoring system comprising a display unit comprising a display, a first wireless transceiver, and at least one first control circuit to receive a first temperature value received wirelessly by the first wireless transceiver and to operate the display to display the first temperature value. The monitoring system further comprises a sensor unit comprising a temperature sensor, a second wireless transceiver, and at least one second control circuit to receive a second value indicating a temperature sensed by the sensor unit and to operate the second wireless transceiver to wirelessly transmit to the display unit the second value of the temperature.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
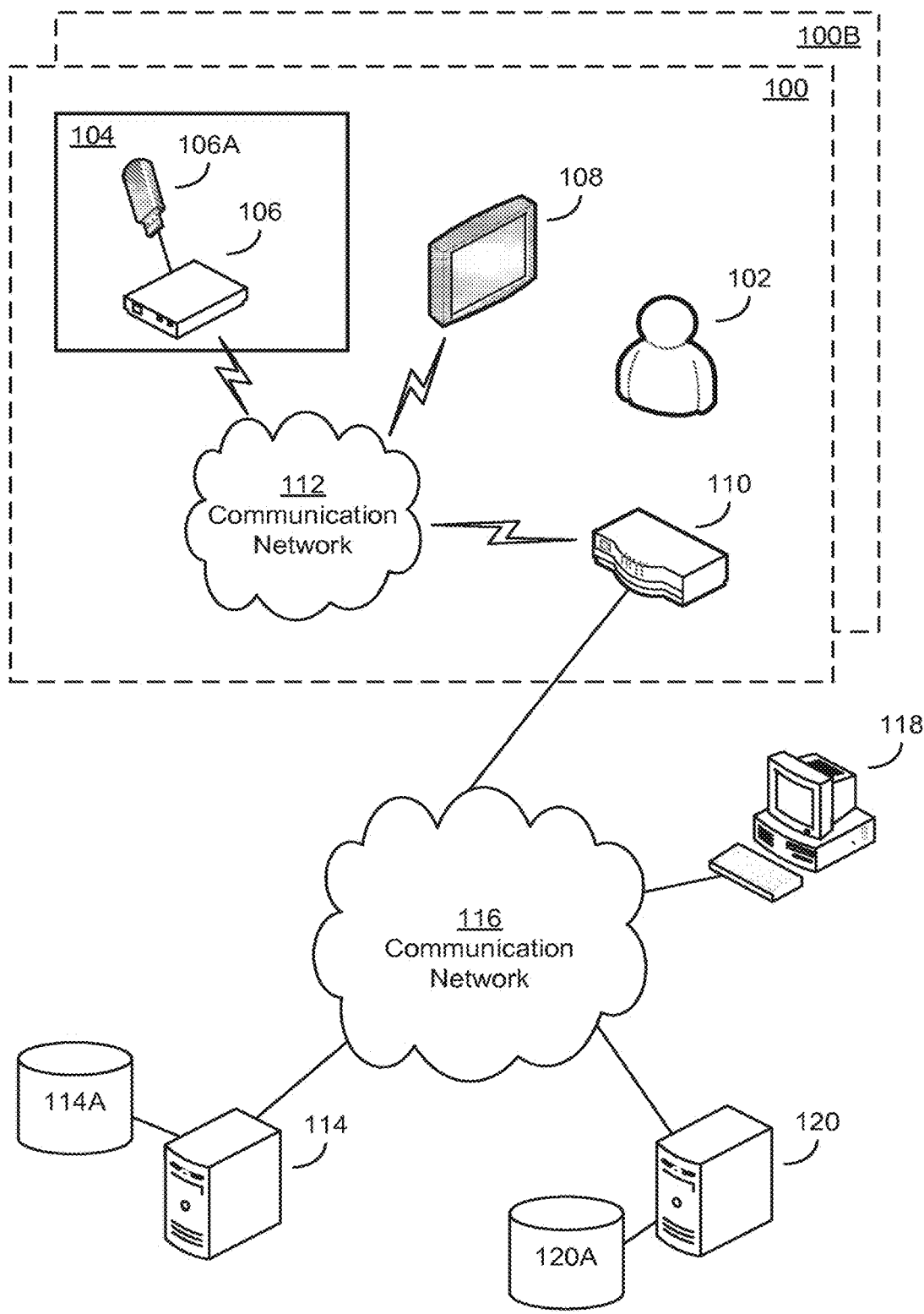
FIG. 1 is an illustration of an exemplary computer system with which some embodiments may operate.

The inventor has recognized and appreciated that complying with strict regulations regarding environmental parameters may be simplified through a new arrangement of hardware (described herein) in systems that monitor for compliance with such regulations, and through configuring that hardware to use particular communication and operating protocols described herein. The hardware and communication protocols may allow for easier installation and configuration, as well as decrease power consumption to increase longevity and reduce the maintenance requirements of such systems.

Many organizations are subject to strict regulations that govern the environmental conditions under which goods are processed, stored, handled, or otherwise used by the organizations. For example, organizations that manufacture, store, and/or sell pharmaceuticals may be subject to strict government and/or industry regulations on how materials or finished pharmaceuticals are stored. Similarly, food service organizations may be subject to strict government and/or industry regulations on storage or processing of food. Compliance with these strict regulations often requires maintaining detailed records on the state of the environment. Automated systems have been proposed for monitoring environmental parameters over time, which may include sensors to sense environmental parameters and displays to show values for those environmental parameters. For such systems to comply with the strict regulations, the detailed records may further include detailed records on the sensors used, such as serial numbers and certification records for those sensors, and a detailed log of every value output by those sensors while in operation. If the records associated with the sensors are not comprehensive, any user of such systems risks being found noncompliant with the strict regulations.

The inventor has recognized and appreciated that the requirements of complying with strict regulations has impacted the design and operation of conventional environmental monitoring systems, including the hardware and communication protocols used in these systems. The inventor has further recognized and appreciated that these hardware and communication protocols make these conventional systems costly and complex to install and maintain, and that the installation and maintenance often requires skilled technicians. The inventor has recognized and appreciated the desirability of an alternative system that enables monitoring of environmental parameters and compliance with strict regulations while enabling easier, do-it-yourself installation of the environmental monitoring system.

The inventor has recognized and appreciated that complexity of conventional environmental monitoring systems is in part driven by designers' perception of hardware and communication protocols that are needed to ensure reliable compliance with the strict regulations. The inventor has recognized, for example, that one complexity of installation of conventional systems is the provision of power to such systems. In the interests of ensuring continuous, reliable operation, components of these conventional systems (such as sensors and displays) are connected to an electrical grid rather than being battery-powered. Because of the connection to the electrical grid, installation of the system may require electricians or other skilled laborers. The inventor has recognized and appreciated that this complexity could be eliminated or mitigated by powering an environmental monitoring system using batteries or other forms of power that do not require a wired connection to an electrical grid. The inventor has also recognized and appreciated that another complexity of installation of conventional monitoring systems is the wiring of connections between different components of the systems (e.g., sensors and displays), which may at times be located far from one another. The inventor has recognized that designers of conventional systems, to ensure reliable communications between system components, connect the components using wired connections rather than risk lost communications, as may occur with wireless communication. Using wired communications, though, increases complexity of installation, as the wired connections may need to be run through walls or through other equipment. This may require electricians and/or other skilled laborers to drill holes and run the wires in a way that will not damage the walls, floors, or ceilings in the area of installation, plumbing or wires disposed in the walls/floors/ceilings, or other equipment in the area. The inventor has recognized and appreciated that this complexity could be mitigated by using wireless communications.

The inventor has therefore recognized and appreciated the advantages of powering components of an environmental monitoring system using batteries (or other power sources that do not require a connection to an electrical grid) and of using wireless communication protocols to pass communications between components of the system. The inventor has further recognized and appreciated, however, that these goals are in tension with one another. Removing wired connections to use wireless connections between components of an environmental monitoring system typically increases the power consumption of the system. Further, if the power consumption were to be increased while not connecting the components to an electrical grid for power, this may require more frequent battery changes. Frequent battery changes would increase the complexity of maintenance of the system and thus may swap one complexity for another.

Moreover, the inventor has recognized and appreciated that implementing wireless communications in an environmental monitoring system may not allow for compliance with strict regulations, if the wireless communications are unreliable and communications are lost. The inventor has thus recognized and appreciated that particular wireless communication protocols that provide for reliable communication may be needed. Though, again, this may be in tension with a desire to reduce power consumption of the system, as reliable communication protocols, including reliable wireless communication protocols, are conventionally implemented by increasing a number of messages exchanged, such as by exchanging acknowledgement messages that confirm receipt of other messages. The inventor has therefore recognized and appreciated that new communication protocols that exchange few messages but ensure reliable communication may be necessary.

The inventor has therefore recognized and appreciated that, if an environmental monitoring system is to be modified to be battery-powered and to include reliable wireless communications between components of that system, it would be advantageous to reduce power requirements of such a system. Wireless communications may be a primary consumer of power in such systems. The inventor has therefore recognized and appreciated that configuring an environmental monitoring system to communicate using new wireless communication protocols that reliably communicate using fewer wireless communications than in conventional wireless protocols, which may reduce power consumption and increase the lifespan of components of the environmental monitoring system. The inventor has also recognized and appreciated that updating a user interface of components of the system, such as updating a display, may be a further driver of power consumption. The inventor has therefore recognized and appreciated the advantages of systems that implement new operating protocols that regulate a number of times a display is updated, to reduce a number of times a display is updated as compared to conventional systems and thereby reduce power consumption. Such new operating protocols may be implemented in hardware or in software, as discussed below.

Accordingly, described herein are embodiments of an environmental monitoring system that mitigates complexities in installation and maintenance while complying with strict regulations on operations of the system. The environmental monitoring system may communicate wirelessly between components such as sensor units and display devices, enabling these components to be separately and easily installed in an environment without needing to install wires in the environment to connect them. In addition, in embodiments at least some of the components (e.g., sensor units and display devices) of the environmental monitoring system may be adapted to wirelessly and reliably communicate using specific wireless communication protocols, described in detail herein, that exchange few communications between the components and thereby decrease power consumption of these components. Further, in some embodiments, a display device may include hardware and/or execute software that drive and/or update a display only when a condition is met. Conditions are discussed below and may include, for example, receipt of a sensed value of an environmental parameter, a determination that a sensed value differs from a previously-output value, or user input requesting display of a most-recently-received sensed value. By driving or updating the display upon satisfaction of a condition, rather than continuously or otherwise frequently, power consumption of the display device can be reduced.

Specific examples of embodiments are described below, but it should be appreciated that embodiments are not limited to operating in accordance with any of the specific examples, as other embodiments are possible.

Environmental monitoring systems may include a number of different user interfaces to display the state of environmental parameters monitored by the systems. For example, some systems may include one or more LEDs or other lights that illuminate when a condition is satisfied, such as that a value of an environmental parameter is outside a normal range. Some systems may include one or more display screens that may display a value of an environmental parameter.

User interfaces may be integrated with other components of an environmental monitoring system, such as integrated with an environmental sensor unit that monitors an environmental parameter. It may be advantageous in some environments, however, for the user interfaces not to be integrated with other components. For example, in a restaurant or convenience store setting, it may be advantageous to have a temperature sensor unit positioned inside of a temperature control equipment, such as refrigeration device or heating device, and to have a separate user interface device positioned outside of the equipment, such that a temperature of the interior of the equipment can be viewed on the user interface without a person needing to enter the equipment.

As discussed above, conventionally, when user interfaces are included in separate devices, the user interface devices may be connected to other components of the environmental monitoring systems via a wired connection that the inventor has appreciated would be disadvantageous. Accordingly, in some embodiments a user interface device communicates wirelessly with a sensor unit or other components of the environmental monitoring system.

In some environmental monitoring systems, there may be multiple different sensor units disposed at different locations and/or monitoring different environmental parameters, and there may be multiple different user interface devices to display information regarding the environmental parameters. It may be advantageous in some such systems to have one of the user interface devices to display information regarding one of the sensor units or other components of the environmental monitoring system, and it may be further advantageous to configure the user interface devices to be able to change associations between different sensor units (or other components).

Processes have previously been implemented to allow devices to wirelessly associate with one another, such as the pairing process implemented in the Bluetooth® protocol. Such wireless association processes may include exchanging multiple configuration messages between devices. The inventor has recognized and appreciated, however, that exchanging multiple configuration messages wirelessly between devices is a drain on power resources of the devices, which is disadvantageous in a power-limited environmental monitoring system.

Described herein are embodiments of an environmental monitoring system including user interface devices, such as display devices including display screens, that are configured to associate with other components of the environmental monitoring system, such as environmental sensor units. Such user interface devices may be configured to associate with the other components without exchanging configuration messages that are specific to the associating of the devices. In some embodiments, the user interface device may not include a transmitter and the new association techniques may be used to establish the association without an exchange of messages between components. For example, the user interface devices may be configured to associate with other components without transmitting any message, but instead only through receiving messages. For example, in some embodiments, a user interface device may determine whether a condition is met and, while the condition is met, monitor for wireless transmissions. If a wireless transmission is detected while the condition is met, the user interface device may extract a device identifier from the transmission and store the identifier to indicate that the user interface device is paired with the device having that device identifier. In some embodiments, the user interface device may monitor for a broadcast wireless transmission, which may have been broadcast according to a stateless and/or best effort communication protocol. In other embodiments, the user interface device may monitor for a broadcast wireless transmission transmitted in accordance with a stateful protocol, such as a stateful protocol implemented in accordance with the ZigBee® communication protocols.

User interface devices that monitor for wireless transmissions responsive to one or more conditions being met may do so in response to various conditions being met, as embodiments are not limited in this respect. In some embodiments, the user interface device may, upon detecting an instruction from a user to establish a new association, which may include dropping a previously-established association. The instruction from the user may be, in some embodiments, a reset instruction to reset one or more configurations of the user interface device that include the association and/or other configurations. In other embodiments, the user interface device may monitor in response to determining that a detector of the user interface device is receiving a signal and monitor during a time that the detector is receiving the signal. The detector and signal may be of any suitable type. In some embodiments, the signal may be an infrared light signal and the detector may be an infrared light detector. For example, in some embodiments an environmental sensor unit may include an infrared light source, such as an infrared light emitting diode. The environmental sensor unit may illuminate the infrared light source in response to determining that a message is to be transmitted wirelessly and during wireless transmission of the message.

In embodiments in which the user interface device establishes an association by monitoring for a wireless transmission, the user interface device may monitor for any suitable wireless transmission. In some embodiments, the wireless transmission may be a message including configuration information regarding an environmental sensor unit. The configuration information may include a device identifier for the environmental sensor unit. The message may, in some embodiments, be a broadcast message. When the message transmitted by the environmental sensor unit includes a device identifier for the environmental sensor unit, the user interface device may receive the message and the device identifier. The user interface device may then store the device identifier to associate the user interface device with the environmental sensor unit.

As part of association, in some embodiments, the user interface device may synchronize an internal clock with a clock of the device with which it associates, based on an analysis of the wireless transmission. Subsequently, the user interface device may, at intervals timed based on the internal clock, monitor for transmissions from the associated environmental sensor unit. Conventional approaches to ensuring reliable communications focus on an exchange of messages from both sides, including messages confirming receipt of transmitted messages. The inventor has recognized and appreciated, however, that the synchronization of clocks together with scheduling exchange of messages may provide reliability in embodiments in which a user interface device does not include a transmitter and cannot transmit confirmation messages.

Accordingly, in some embodiments, following association, an environmental sensor unit may be configured to transmit one or more values for one or more environmental parameters, sensed by the environmental sensor unit, according to a fixed interval. When the user interface device receives the transmission, the user interface device may output the received values via the user interface, such as by outputting the received values via a display. In some embodiments, at times other than at the occurrence of the interval, the user interface device may not operate a wireless transceiver (or wireless receiver) and may not monitor for wireless transmissions, and in some embodiments may be placed into a "sleep" mode of suspended operation. Doing so may reduce power consumption on the user interface device.

The inventor has additionally recognized, however, that despite synchronization during association, there may be times at which a sensor unit and a transmitter slip out of phase with one another or cases in which two devices otherwise can no longer reliably communicate with one another according to the existing configuration. In conventional approaches, such a problem might be solved by one or both sides sending re-initialization messages, such as re-configuration messages. However, as a user interface device in embodiments may not include a transmitter, or may be placed into a suspended operation mode between expected receipt of messages, in embodiments it may be difficult for the two devices to send/receive re-initialization messages. The inventor has recognized and appreciated, therefore, that in some embodiments in which the user interface device does not include a transmitter, to increase reliability of communications a procedure may be implemented by which the user interface device listens at different times and/or for a longer period of time for a message from the sensor unit. The inventor has recognized and appreciated that one such procedure may include the user interface device listening for a message from the sensor unit for an extended period, such as until a message from the sensor unit is received. The inventor has additionally recognized and appreciated, however, that listening for messages in this manner may consume a large amount of power. The inventor has therefore recognized and appreciated that it may be advantageous in embodiments for the user interface device to intermittently listen for messages and, at times that the user interface device is not listening for messages, enter a suspended operation mode. Such a procedure may result in the user interface device missing a message from a sensor unit and not re-associating with the sensor unit, but may keep power consumption in the user interface device low and extend a battery life of the user interface device.

In embodiments in which a user interface device is a display device including a display, hardware and/or software may be used to limit a number of times that the display is driven and/or updated, to reduce power consumption of the display. For example, the display may be implemented as an electronic paper display, which may be an electrophoretic display. Such displays do not consume power, or consume little power, when the display is static and unchanging and instead only consume power when changing displayed content. Including such a display in the display device may reduce power consumption as compared to alternative displays, but power consumption may be further reduced through use of operating protocols that limit when the electronic paper display is driven to change the content. By reducing the number of times the display is driven to change the content, power consumption may be further reduced. As discussed in detail below, in some embodiments the user interface device may execute software that determines whether to update a display by determining whether a condition is met, and refraining from updating the display when the condition is not met. Examples of such conditions are described in detail below.

It should additionally be appreciated that while, for ease of description above and below, a user interface device, including a display device, is described as associating with and communicating with an environmental sensor unit, in some embodiments the environmental sensor unit may be implemented as a base station, as discussed below in connection with FIG. 1. In some such embodiments, the base station may receive communications from one or more other sensor units, and the base station may transmit to the user interface device information on any environmental conditions that are detected by sensors of the base station and/or of a different environmental sensor unit communicating with the base station. Accordingly, it should be appreciated that in some embodiments a user interface device may associate with and communicate with a base station in accordance with techniques described below, with the base station performing operations described below in some examples as being performed by an environmental sensor unit.

FIG. 1 illustrates an example of a computer system with which some embodiments may operate. The computer system of FIG. 1 includes an environment 100 for which an environmental monitoring system may monitor one or more environmental parameters. In some embodiments, the environmental monitoring system may monitor environmental parameters for multiple environments, including by maintaining an account for multiple different operators that are each customers of the environmental monitoring system and that each own and/or manage one or more environments. FIG. 1 therefore illustrates environment 100 as well as one or more other environments 100B.

It should be appreciated that embodiments are not limited to operating with any particular type of environment or, as monitoring equipment may vary in type or number or in the kind of environmental parameter monitored depending on the type of environment, any particular type of monitoring equipment. As one example, an environment may be a restaurant and monitoring equipment may include sensors for monitoring temperature, such as temperature of temperature control equipment for food storage. Such temperature control devices may include a chamber for which the temperature is controlled to be higher or lower than an ambient temperature, such as refrigeration devices (e.g., freezers and refrigerators) that keep a temperature in the chamber lower than an ambient temperature or heating devices that keep a temperature in the chamber above ambient temperature. As another example, an environment may be a pharmaceutical manufacturing facility and monitoring equipment may include sensors for monitoring ambient conditions in an environment and conditions on an interior of equipment disposed in the environment. For example, in a pharmaceutical facility, monitoring of an ambient environment and/or environment inside equipment may be carried out for humidity, atmospheric pressure, temperature, the presence of dust, the presence of one or more chemicals in the air that may affect health and/or manufacturing, and/or any of various other conditions that may affect a manufacturing process.

FIG. 1 illustrates an example of an environment and environmental monitoring equipment that may be used in connection some environments. As shown in FIG. 1, environment 100 is associated with an operator 102, which may be a human or entity that owns and/or manages, or otherwise operates, environment 100. Environment 100 may include one or more pieces of equipment 104, which may be temperature control equipment (e.g., refrigeration devices or heating devices) or other suitable equipment. Equipment 104 may include an interior chamber. Embodiments described herein are not limited to working with equipment 104 of any particular size and an interior chamber of equipment 104 may be of any suitable size.

The environment 100 may further include one or more environmental sensor units 106, each of which may include one or more environmental sensors 106A. Each environmental sensor 106A may be integrated with an environmental sensor unit 106 or may be removably connected to an environmental sensor unit 106A via physical port disposed on an exterior of the unit 106, as discussed in more detail below.

In some embodiments, at least one of the environmental sensor units 106 may be disposed in the interior chamber of the equipment 106, to monitor conditions of an environment inside the equipment 106.

The environmental sensor units 106 may communicate with a base station 110 (which may also be configured to act as an environmental sensor unit and which may include one or more environmental sensors) via a communication network 112. Network 112 may be one or more wired and/or wireless networks including a wireless personal area network (WPAN) such as a ZIGBEE® network, a wireless local area network (WLAN) such as IEEE 802.11, a wireless wide area network (WWAN) such as a cellular network.

Environmental sensor units 106 and base station 110 may be arranged and operate in any suitable manner to monitor one or more environmental parameters of the environment 100. For example, the units 106 and base station 110 may be implemented in accordance with exemplary devices and techniques described in U.S. patent application Ser. Nos. 12/275,935 filed on Nov. 21, 2008 ("the '935 application"), Ser. No. 12/275,971 filed on Nov. 21, 2008 ("the '971 application"), Ser. No. 13/340,051 filed on Dec. 29, 2011

("the '051 application"), and/or Ser. No. 13/474,372 filed on May 17, 2012 ("the '372 application"), Ser. No. 14/529,040 filed on Oct. 30, 2014 ("the '040 application"), Ser. No. 14/180,791 filed on Feb. 14, 2014 ("the '791 application"). Each of these prior applications is incorporated herein by reference in their entireties and at least for their discussion of techniques of operating environmental monitoring systems and environmental sensor units and base stations of such systems. Any terminology that is used herein in a manner that conflicts with the use of that terminology in any of these prior applications should be afforded a meaning most consistent with its use herein.

In brief, in some embodiments an environmental sensor unit 106 may include one or more sensors 106A, each of which may be integrated with the environmental sensor unit 106 or communicating via a wired and/or wireless connection with the environmental sensor unit 106 (and/or with a base station 110, which may act as an environmental sensor unit). The sensors 106A may collect data on one or more environmental parameters of the environment, including on how the environmental parameters change over time. In some cases, the environmental sensor unit 106 may perform processing on raw values collected by a sensor 106A, which may be any suitable processing as embodiments are not limited in this respect.

Environment 100 may further include a display device 108, which may include a display and which may output via the display information regarding the environment 100. In particular, the display device 108 may receive from an environmental sensor unit 106 values of environmental parameters sensed by a sensor 106A and, following receipt, output the value via the display. The display device 108 may communicate with the unit 106 via the network 112, including wirelessly via the network 112. As discussed in more detail below, the display device 108 may be associated with a sensor unit 106 and, in a case that there are multiple sensor units 106 in the environment 100, only display values received from the sensor unit 106 with which it is associated. In some embodiments, the display device 108 may only receive data via the network 112. In such embodiments, the display device 108 may not include any wireless transmission components or any other hardware that permits the transmission of wireless signals. The display of the display device 108 may, in some cases, be an electronic paper display such as an electrophoretic display.

As discussed in detail below, the display device 108 may implement wireless communication protocols and execute software to control the updating of the display, each of which contributes to lowering the power consumption of the display device 108 and the sensor unit 106 with which the device 108 communicates.

A unit 106 may have been paired, either manually or through an automatic pairing process (such as the pairing processes described in the '372 application), with a base station 110. The unit 106 may transmit raw data and/or processed data regarding environmental parameters to the base station 110 via the network 112. The base station 110 may collect data from one or more sensor units 106 in the environment and may transmit data regarding environmental parameters to one or more servers of an environmental monitoring system that are located remote from the environment 100. The communications between the sensor units 106 and the base station 110, and the base station 110 and the servers remote from the environment, may be in any suitable format and in accordance with any suitable protocol, as embodiments are not limited in this respect. In some embodiments, the communications may be formatted according to stateless and/or best effort communication protocols, or stateful protocols, such as protocols described in the '935 application, the '971 application, and the '372 application.

FIG. 1 illustrates a server 114 (which may be one or more servers, or one or more of any other type of computing device) that may be included in an environmental monitoring system and that may include a data store 114A. The server 114 may execute an environmental monitoring facility that receives and processes data from sensor units 106 located in environment 100 and other sensor units located in the environment(s) 100B. The environmental monitoring facility on the server 114 may process the data in any suitable manner, including in accordance with techniques described in the '935 and '971 applications or any of the other prior applications. For example, the data store 114A may include an account for each operator 102 that is a customer of the environmental monitoring system. The data stored in data store 114A for account of an operator 102 may specify alarm conditions and alert actions to be taken when an alarm condition is met. The environmental monitoring facility may receive data regarding environmental parameters from environmental sensor units and store the data in the data store 114A in association with the account of the operator of the environment to which the data relates. The facility may additionally evaluate newly-received data alone and/or together with previously-received data to determine whether one or more alarm conditions are met, such as by determining whether a temperature in an area is outside an acceptable range or is changing too rapidly. When the facility determines that the data satisfies the alarm condition(s), the facility may take one of the alert actions, such as by placing a phone call or sending an email or text message to the operator.

The environmental monitoring system may further include a user interface by which information regarding an account of an operator, including information on current or previous values of environmental parameters, may be viewed by an operator or others. In some embodiments, the user interface may be viewable on a computing device 118, such as a desktop or laptop personal computer, a smart phone, or any other computing device. The user interface may be implemented in any suitable manner, as embodiments are not limited in this respect. In some embodiments, for example, the user interface may be implemented as a set of one or more web pages that may be stored in data store 114A and that may be downloaded by the computing device 118 and displayed to a user. Examples of user interfaces are described in the '935, '971, and '051 applications.

In connection with techniques described herein, the user interface of the environmental monitoring system may additionally include (or alternatively be) viewed on a display of the display device 108. Current or previous values of environmental parameters may be output via the display device 108. In some embodiments, alerts may also be displayed via the display device 108 when an alarm condition is met. In some embodiments, the display device 108 may not communicate directly with the server 114, but may instead communicate only with the sensor unit 106 with which the display device 108 is paired. As discussed below, by communicating with only one other component of the environmental monitoring system, and by communicating with that component at fixed intervals, power consumption of the display device 108 may be lowered as compared to other communication protocols. Accordingly, for the display device 108 to display an alert, in some embodiments the server 114 may communicate the alert to the sensor unit 106, such as in a message confirming receipt of a prior message transmitted by the sensor unit 106 and including one or more values of one or more environmental parameters. Following receipt of the alert, the sensor unit 106 may communicate the alert to the display device 108 and, in turn, the display device 108 may display the alert.

Some embodiments may additionally include a certification system for use with the environmental monitoring system that includes the server 114 and the sensors 106A, the sensor units 106, and base station 110. In some such embodiments, an operator may desire or be required by industry and/or government regulations to certify the proper operating performance of sensors deployed in an environment. For example, the sensors may be certified as compliant with standards for sensors set by a standards-setting body, which may be an industry body or a government body such as the U.S. National Institute of Standards and Technology (NIST). Any suitable standards set by any suitable entity may be used, as embodiments are not limited in this respect. In some such embodiments, the certification system may manage the certification of the sensors in the environment and assist the operator with ensuring that, before the expiration of a certification of a sensor, a newly-certified sensor is available and installed in the environment to replace the sensor for which certification is to expire.

FIG. 1 illustrates a server 120 that may implement a certification facility and maintain a data store 120A to manage certifications of one or more environmental sensors of one or more environments. Server 120 may be implemented as a set of one or more servers, or as one or more of any other type of computing device, as embodiments are not limited in this respect. Additionally, while FIG. 1 illustrates server 120 and its data store 120A separate from server 114 and data store 114A, in some embodiments the server and data store of the certification system may be implemented on the same server(s) 114 and data store 114A.

Figure 2:
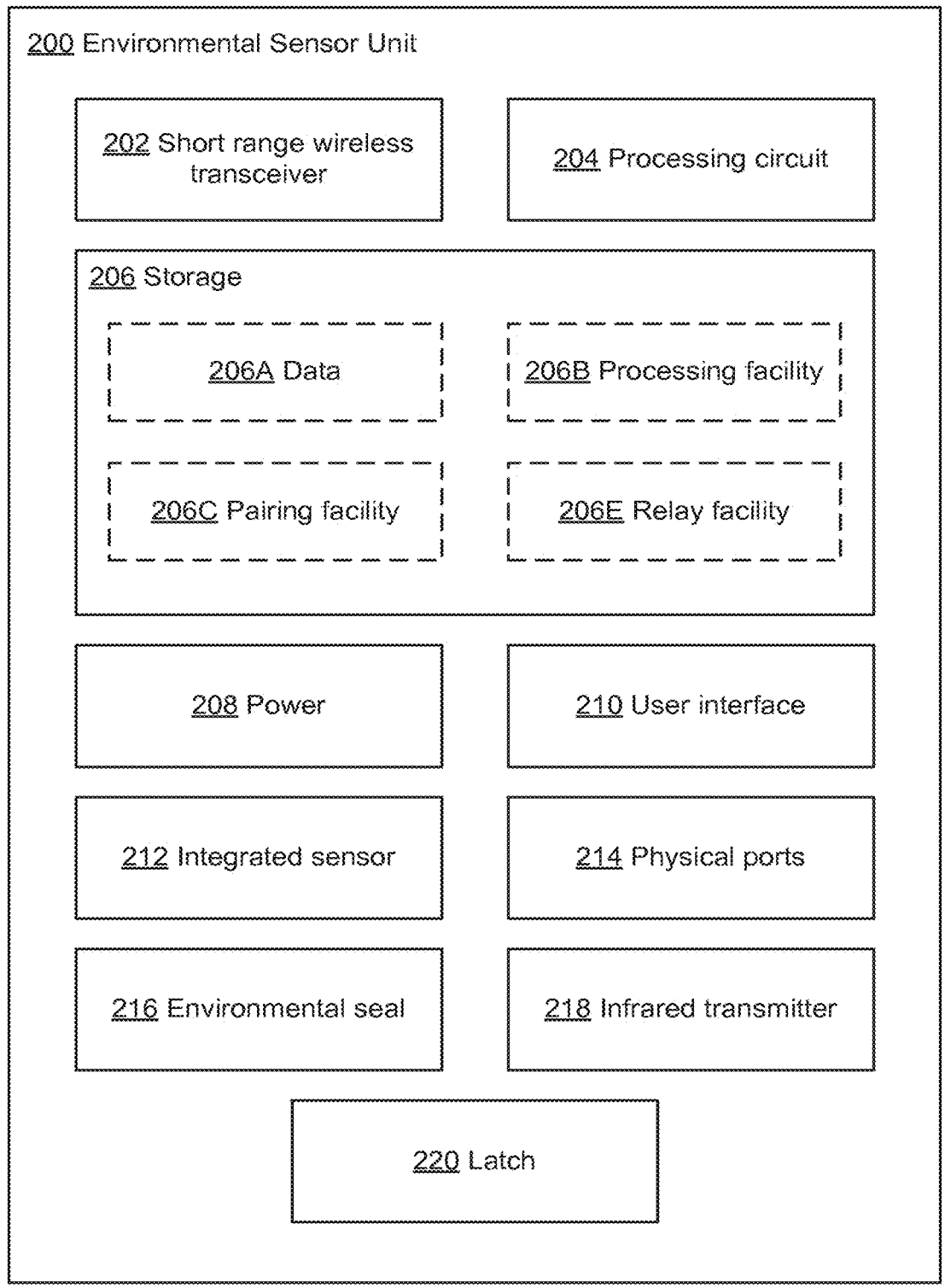
FIG. 2 is a block diagram of some components of an exemplary sensor unit with which some embodiments may operate.
Figure 3:
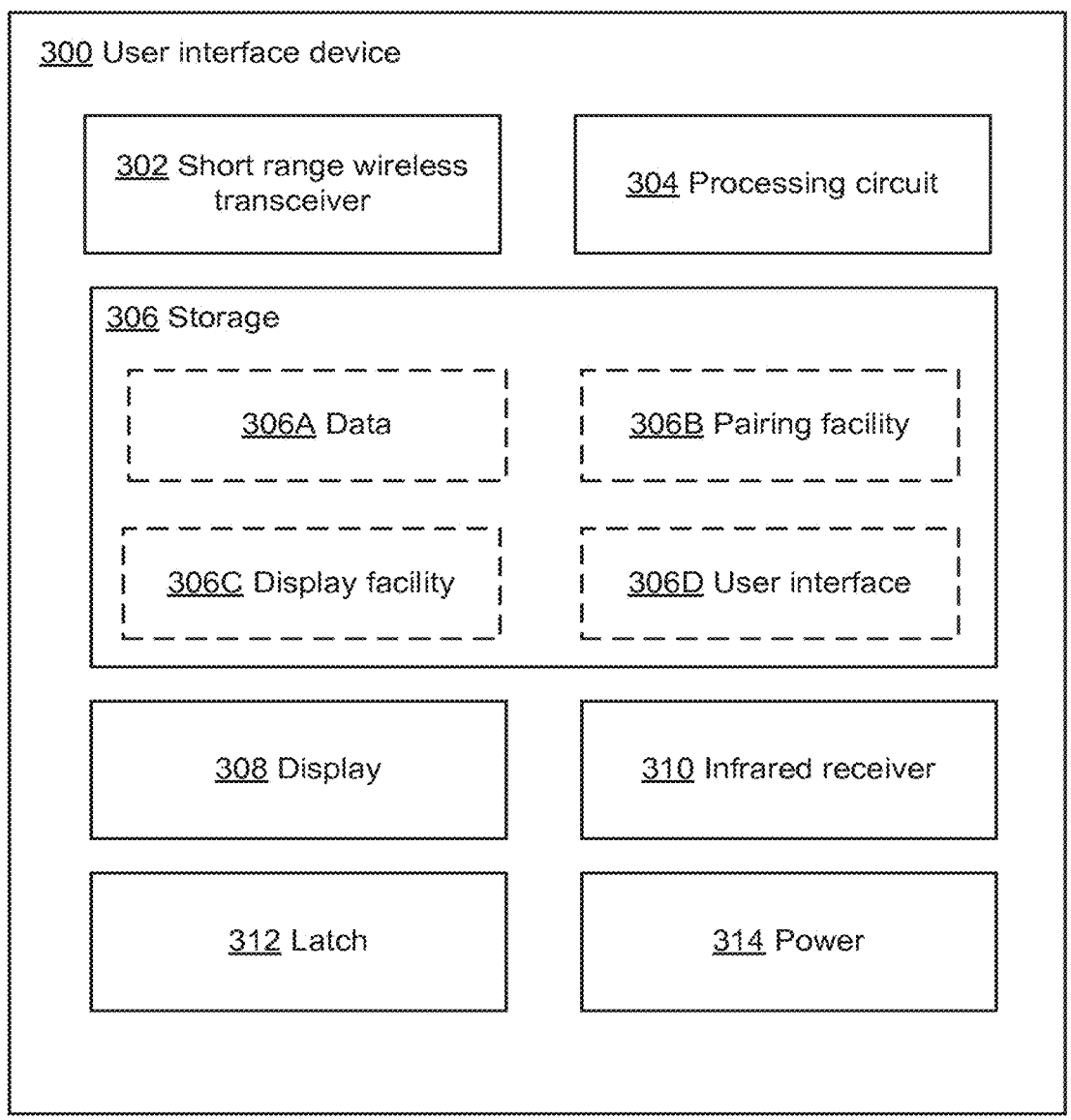
FIG. 3 is a block diagram of some components of an exemplary user interface device with which some embodiments may operate.

FIGS. 2 and 3 are block diagrams of exemplary devices that may act as environmental sensor units and display devices in accordance with some techniques described herein. It should be appreciated, however, that embodiments are not limited to implementing environmental sensor units and display devices according to the examples of FIGS. 2 and 3.

The environmental sensor unit 200 in the example of FIG. 2 includes a wireless transceiver 202 that implements a short-range wireless communication protocol. In this context, a short-range protocol may be one for which communications are not transmitted beyond the environment 100, as opposed to long-range wireless communications that are transmitted beyond the environment 100. An example of a long-range wireless communication protocol would be a WWAN protocol, such as a cellular protocol. Examples of short-range protocols include WPAN protocols, WLAN protocols, or other similar protocols. As such, a short-range wireless protocol may be one that has a range (under normal conditions for testing range) of up to 200 meters, up to 100 meters, up to 50 meters, or up to 15 meters. In some case, for example, the short-range wireless transceiver 202 may be one that operates according to the ZIGBEE® wireless communication protocol. The transceiver 202 is able to communicate data from the environmental sensor unit 200 and receives data communicated to the environmental sensor unit 200. Data that is communicated from the environmental sensor unit 200 may include data regarding one or more conditions of an environment monitored using one or more environmental sensors of the environmental sensor unit 200. Data that is communicated to the environmental sensor unit may include, for example, acknowledgements of receipt of data, commands to establish a reporting time for sensor data or updates to programming within of the sensor unit.

The wireless transceiver 202 may be operated by a processing circuit 204 to send and receive data for the environmental sensor unit 200. The processing circuit 204 may execute instructions stored in a storage 206 and process data stored in the storage 206. The data stored in the storage 206 may include data 206A, which includes data collected by one or more environmental sensors of the environmental sensor unit 200. The instructions stored in the storage 206 that may be executed by the processing circuit 204 to carry out operations for the environmental sensor unit 200 may include a processing facility 206B, a pairing facility 206C, and a relay facility 206E.

In the illustrated embodiment in which each of the facilities is implemented by a processor executing stored computer-executable instructions, processing circuit 204 may execute the processing facility 206B to perform processing on data that has been collected by one or more environmental sensor units and that is to be transmitted from the environmental sensor unit 200 by wireless transceiver 202. As discussed in detail in applications incorporated herein by reference (the '935, '971, '051, '372, '040, and the '791 applications), the processing facility 206B may cause the environmental sensor unit to perform multiple different types of processing on data collected by environmental sensors. The processing facility 206B may cause the environmental sensor unit to select a processing to be carried out on data collected by an environmental sensor based on a type of the environmental sensor, which identifies an environmental condition to which the data relates. In some embodiments, processing may entail determining when and whether to transmit a sensor measurement. For example, in some embodiments, a sensor unit may transmit sensor readings at scheduled times such that processing may entail tracking whether a scheduled time has been reached and, if so, transmitting a sensor reading. In other embodiments, processing may involve multiple sensor measurements. For example, processing may entail computing an average value of a sensor over a period of time. As yet another example, the processing may entail determining occurrence of one or more conditions, such as whether a sensor value exceeds a threshold or otherwise meets a condition communicated to the sensor unit.

The processing circuit 204 may execute the pairing facility 206C to associate the environmental sensor unit 200 with another device of an environmental monitoring system of which the environmental sensor unit 200 forms a part. As discussed in detail below in connection with FIGS. 6A/6B and FIGS. 7A/7B, the pairing facility 206C, when executed, causes the environmental sensor unit 200 to communicate with a display device within range of the wireless transceiver 202 to cause the display device to associate with the sensor unit 200.

The processing circuit 204 may execute the relay facility 206D to receive communications transmitted to the environmental sensor unit 200 from a server of the environmental monitoring system and relay those communications received from the environmental sensor units to a display device. As discussed below in connection with FIG. 9, the relay facility 206D may cause the environmental sensor unit to operate the wireless transceiver 202 to receive communications from the server and, in response to determining that the communications indicate an alert, operate the wireless transceiver 202 to transmit an alert to the display device with which the sensor unit 200 is associated.

Embodiments are not limited to implementing the processing circuit 204 or the storage 206 in any particular manner. In some embodiments, the processing circuit 204 may be implemented as a circuit able to execute instructions stored in a suitable storage circuit. For example, the processing circuit 204 may be implemented as a microprocessor, including as a microprocessor designed to execute a reduced instruction set, and the storage 206 may be implemented as a memory. However, it should be appreciated that it is not a requirement that each facility be implemented by a processor executing stored instructions. In other embodiments, for example, the processing circuit 204, storage 206, and facilities 206A-206D may be implemented in circuitry that is configured perform the functions of the facility.

The environmental sensor unit 200 further includes a power source 208. Power source 208 may, in some embodiments, be a source of AC power or a battery. In other embodiments, the power source 208 may include a battery. For example, in some embodiments, the battery of power source 208 may be one or a set of two, four, or six AA or AAA batteries. In other embodiments, the power source 208 may be or include an energy harvester, such as a solar cell, a thermal energy harvester, a kinetic energy harvester, or any other component that may produce electric power from other forms of energy.

Environmental sensor unit 200 may further include a user interface 210, which may be any suitable interface for presenting information to the user. In some embodiments, to limit power consumption associated with the user interface 210 the user interface 210 may be implemented as one or more light emitting diodes (LEDs). The user interface 210 may present information to the user by illuminating a particular LED or set of LEDs, or by displaying a particular pattern of illumination using the LEDs. The information presented via the user interface 210 may be any suitable information, such as information regarding a state of the environmental sensor unit 200 and/or a condition of the environment. The information regarding the state of the environmental sensor unit may include error information, such as an indication that the environmental sensor unit 200 is not able to communicate wirelessly with other devices of the environmental monitoring system or that the environmental sensor of the environmental sensor unit 200 is malfunctioning.

Environmental sensor unit 200 may also include one or more environmental sensors to measure conditions of the environment in which the environmental sensor unit 200 is located. The environmental sensors may include sensors to measure any suitable condition of an environment. Examples of such conditions of an environment include temperature, air quality, humidity, soil moisture, wind speed, presence or absence of flood, voltage levels, and barometric pressure. Environmental sensors of the environmental sensor unit 200 may be implemented as integrated sensors 212, or as external sensors connected to the environmental sensor unit 200 via one or more of the physical ports 214. The physical ports 214 may be implemented as wired communication ports that permit easy expansion of the environmental monitoring system. The ports 214 may permit easy expansion of the environmental monitoring system by permitting an operator of an environment to easily add sensors to an environmental sensor unit. In this way, the operator may expand the number of type of environmental conditions that can be measured. When the operator desires to add an environmental sensor, such as to monitor a different condition of the environment, the operator may connect the new environmental sensor to a physical port of the environmental sensor unit 200 and the environmental sensor unit 200 may begin using the environmental sensor to collect data regarding a condition of the environment.

Environmental sensor unit 200 may include a housing including the components 202-212 discussed above, as well as including physical ports 214 that are exposed to an exterior of the housing. Environmental sensors that are integrated sensors 212 may be located within the housing and may be connected to a circuit board to which components 202-214 are connected. Environmental sensors that are external to the environmental sensor unit 200 and connected to the environmental sensor unit may be located outside of the housing. The housing may include an environmental seal 216, which may environmentally seal the components inside the housing by making the housing watertight and/or airtight, or otherwise environmentally sealed. The physical ports 214 may extend from an interior of the environmental seal 216 to an outside of the environmental seal 216.

Regardless of where the environmental sensors are disposed relative to the environmental sensor unit, when the environmental sensors measure conditions of the environment, the environmental sensors produce data regarding the environmental conditions. The data regarding the environmental conditions may be stored in the storage 206 as data 206A, and may be processed by the processing circuit 204, executing the processing facility 206B, according to the type of environmental sensor that produced the data and the environmental condition to which the data relates. Once the data is processed by the processing facility 206B, the processed data may be output to the wireless transceiver 202 and transmitted from the environmental sensor unit 200.

Regardless of the specific processing performed on data regarding an environmental condition by the processing facility 206B, in some embodiments, when the processor circuit 204 prepares processed data regarding an environmental condition for transmission from the environmental sensor unit 200, the processor circuit may provide the processed data to the wireless transceiver 202 together with an identification of a type of the environmental sensor that originally produced the data and/or an identifier for the environmental sensor and/or the environmental sensor unit 200. Accordingly, when the wireless transceiver 202 transmits the processed data, the wireless transceiver may also transmit the identification of the sensor type, an identifier for the environmental sensor unit 200, and/or an identifier for the environmental sensor. Doing so may satisfy strict regulations on collection of environmental data, as discussed above. For example, the regulations may require that the values be associated in a record with a sensor and with a demonstration of when that sensor was last certified as functioning properly, and including the identifier for the sensor and/or sensor unit may aid in satisfying those requirements.

The sensor unit 200 may further comprise an infrared transmitter 310 to emit infrared light, which may be used in an association process by the pairing facility 206B in some embodiments, as discussed further below in connection with FIGS. 7A/7B.

The sensor unit 200 may additionally be provided with a latch 220. The latch 220 may be one of a pair of complementary latch components, the other of which is disposed on a display device (as discussed below in connection with latch 312 of FIG. 3). The complementary latch components may be complementary in that the two may be joined to hold the sensor unit 200 in physical proximity to a display device, such as in physical contact with the display device. The latch may be a mechanical latch that relies on mechanical forces to hold the sensor unit 200 near or to the display device, or may be a magnetic latch that relies on magnetic forces to hold the sensor unit 200 near or to the display device. In the case of a mechanical latch, the two latch components may have complementary shapes, while in the case of a magnetic latch, the two latch components may have complementary magnetic fields.

FIG. 3 illustrates one example of a user interface device that may be used in some embodiments of an environmental monitoring system. As discussed above, the user interface device 300 may act as a part of a user interface of the environmental monitoring system and may wirelessly communicate with other components of the environmental monitoring system to display data on the environment. Accordingly, the user interface device 300 of FIG. 3 includes a wireless receiver 302. The wireless receiver 302 of this example operates according to a short-range wireless protocol, which is the same short-range wireless protocol as the transceiver 202 of FIG. 2. As a specific example of such a protocol, the receiver 302 may implement the ZIGBEE® wireless communication protocol.

In embodiments, the user interface device 300 may not transmit any information, but instead may only receive information. Accordingly, the receiver 302 may not be a transceiver and the device 300 may otherwise not include wireless transmission components.

The user interface device 300 may additionally include processing circuit 304 and storage 306, which may be implemented in the manner described above in connection with corresponding components of the environmental sensor unit 200 of FIG. 2. The storage 310 stores data to be processed by the processing circuit 308 and instructions to be executed by the processing circuit 308. The data stored by the storage 306 includes data 306A, which may include data received from an associated environmental sensor unit. The instructions stored by the storage 306 may include a pairing facility 306B, a display facility 306C, and a user interface 306D. Operations of the pairing facility 306B and display facility 306C are discussed in detail below in connection with FIGS. 6A/6B and 7A/7B, and FIG. 10. In brief, the pairing facility 306B may operate to associate the user interface device 300 with an environmental sensor unit, and the display facility 306C may control a user interface, such as the display 308, to regulate when the display 308 is driven and when content output via the display 308 is changed. The user interface 306D may operate to receive and respond to input from a user, and to communicate information to a user via the display 308 or other user interface components of the device 300.

In some embodiments, the user interface of the device 300 may include a display, which may be a screen by which to output text and/or images. The display 308 may be implemented as a liquid crystal display in some embodiments, a seven-segment display in some embodiments, and an electronic paper display in other embodiments. In embodiments in which an electronic paper display is used, the electronic paper display may be implemented as an electrophoretic display. In some embodiments, an electrophoretic display may be advantageous, as the electrophoretic display may draw much less power than alternative displays when content output via the electrophoretic display is not being changed. This may reduce power consumption of the device 300 as a whole.

The user interface device 300 may further comprise an infrared receiver 310 to detect infrared light, which may be used in an association process by the pairing facility 306B in some embodiments, as discussed further below in connection with FIGS. 7A/7B.

The device 300 may additionally include a latch 312, which may be a latch that is complementary to a latch of a sensor unit to hold the device 300 in proximity to or in contact with a sensor unit. The latch 312 may be implemented as described above in connection with latch 220 of FIG. 2.

Power source 314 of the user interface device 300 may be implemented in the user interface device 300 according to the description provided above of power source 208 of FIG. 2, though the power source 312 may be specifically implemented in embodiments in a manner that is different from a specific implementation of the power source 208. Therefore, for the sake of brevity, a detailed description of components 308-318 of base station 300 is not duplicated here.

Figure 4:
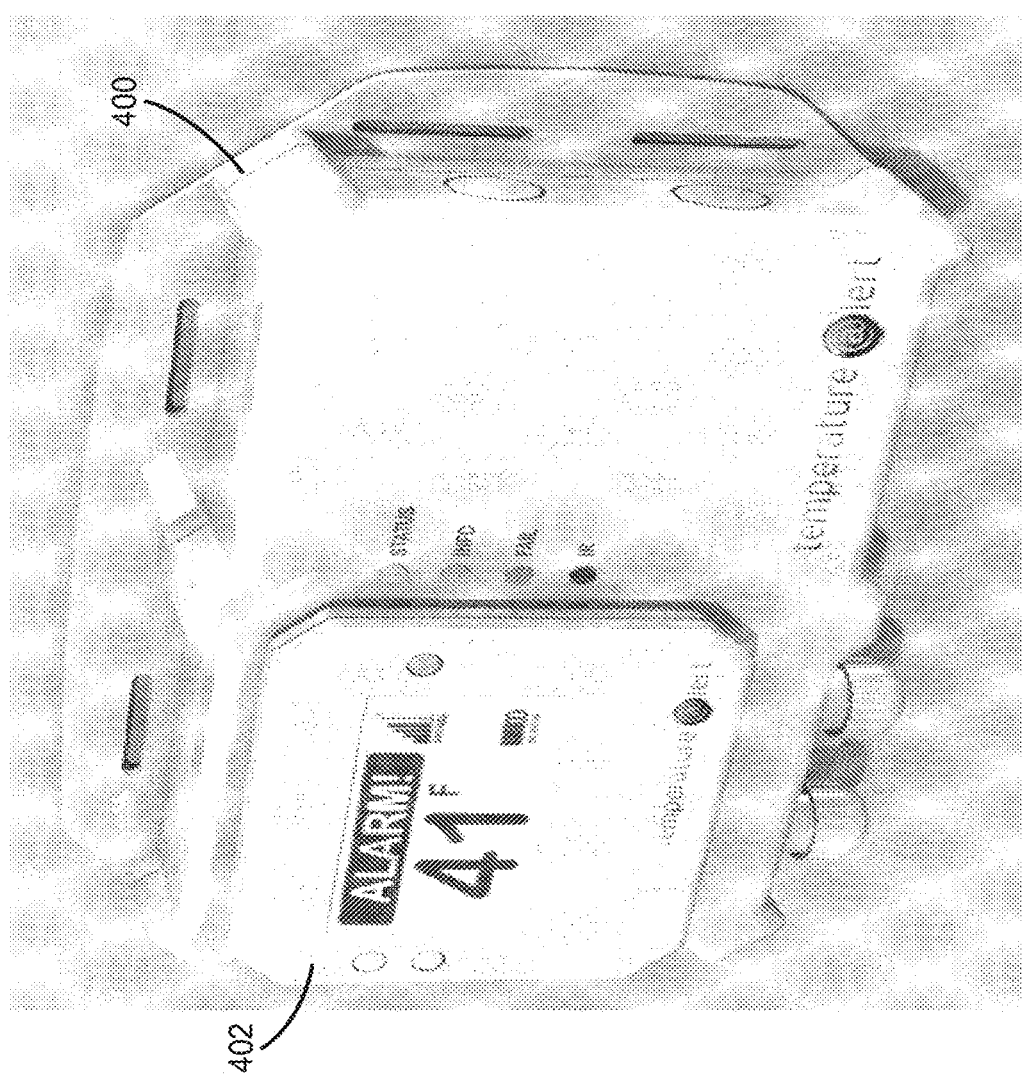
FIG. 4 is an illustrative of a combination of examples of a sensor unit and a user interface device with which some embodiments may operate.

FIG. 4 illustrates examples of a sensor unit 400 and a display device 402. FIG. 4 shows the sensor unit 400 held in proximity to a display device 402 by latches, such as the latch 220, 312 of FIGS. 2-3.

As discussed above, it should be appreciated that embodiments are not limited to implementing an environmental sensor unit and a user interface device according to the examples discussed above in connection with FIGS. 2-4.

Described below in connection with the flow charts of FIGS. 5-10 are examples of various processes that may be carried out in connection with environmental monitoring systems that operate according to techniques described herein. The processes of FIGS. 5-10 may be used with any suitable environmental monitoring system, including environmental monitoring systems including devices according to the examples of FIGS. 1-4.

Figure 5:
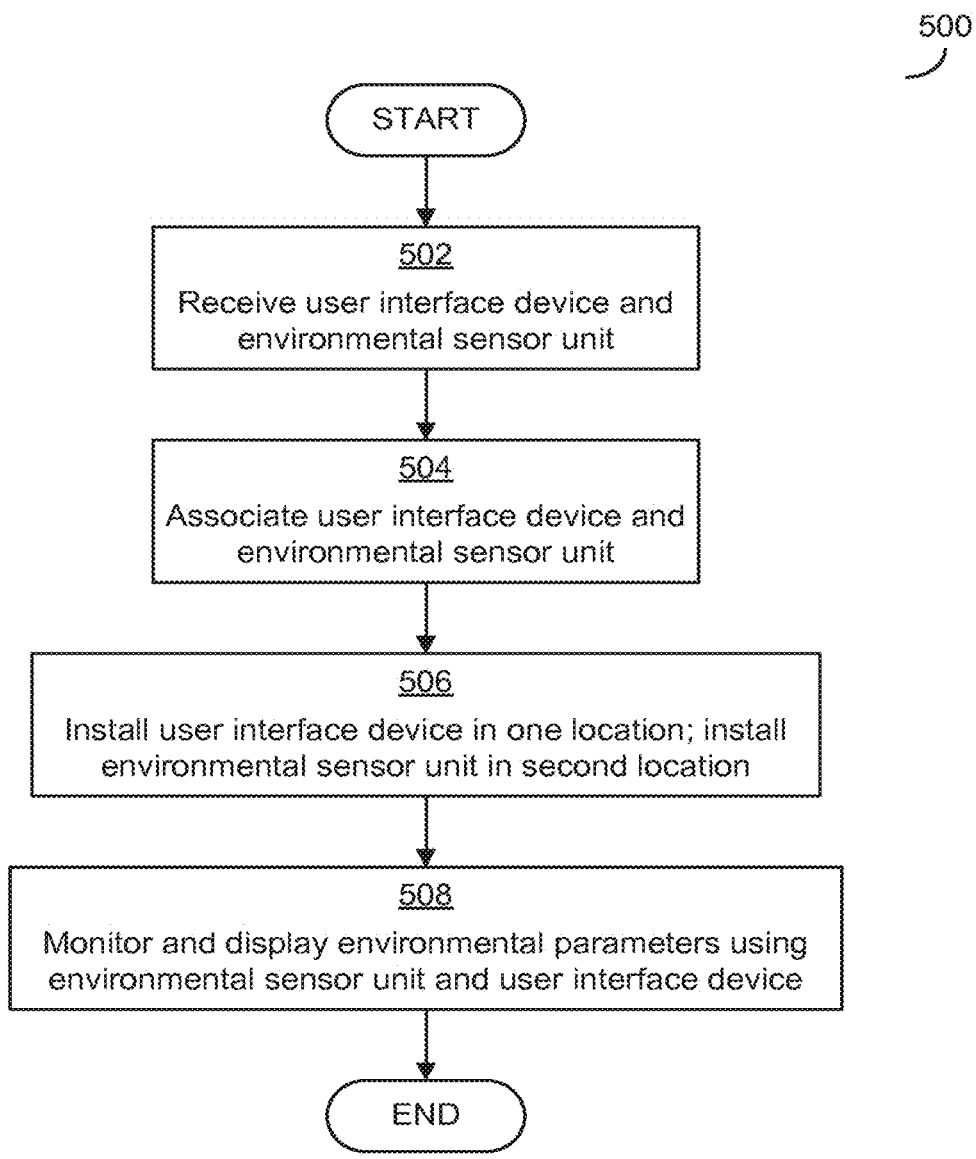
FIG. 5 is a flowchart of an exemplary process for installing an environmental monitoring system in an environment.

As discussed above, operators of environments may require that an environmental monitoring system be able to be installed and configured by a layperson and/or with little effort and expense. FIG. 5 illustrates a process that may be carried out in some embodiments for installing an environmental monitoring system in an environment, and configuring the environmental monitoring system with limited configuration input to the environmental sensor unit(s) and display device(s) from an operator of the environment in which the environmental monitoring system is installed. The process of FIG. 5 is discussed in terms of an environmental monitoring system with one sensor unit and one display device, but it should be appreciated that an environmental monitoring system may include multiple sensor units and/or multiple display devices.

FIG. 5 begins in block 502, in which an operator of an environment receives from an operator of an environmental monitoring system a user interface device (which may be, for example, a display device) and an environmental sensor unit. The operator of the environment may receive the two devices directly from the operator of the system, via a reseller such as a retail distributor, or in any other manner, as embodiments are not limited in this respect. The two devices may be configured to communicate with one another, and the sensor unit may be configured to communicate with other devices, wirelessly.

In block 504, the operator of the environment associates the user interface device with the environmental sensor unit. In some cases, the associating of block 504 may be unnecessary during an initial configuration/installation of the devices, as the operator of the environmental monitoring system may distribute pairs of user interface devices and environmental sensor units that have been previously associated to one another. In other cases, however, the prior association of the devices may have been deleted or the operator may have distributed the user interface device and the environmental sensor unit without prior association.

The associating of block 504 may be carried out in connection with a specific wireless communication protocol that is implemented by each of the user interface device and the environmental sensor unit. The wireless communication protocol may include transmitting communications from the environmental sensor unit to the user interface device upon satisfaction of a condition. In embodiments, as part of the associating, the user interface device may not transmit any communications to the environmental sensor unit. Indeed, in some embodiments, as discussed above, the user interface device may lack any hardware by which to transmit any wireless communications.

Examples of associating processes that may be implemented by the environmental sensor unit and the user interface device are described below in connection with FIGS. 6A, 6B, 7A, and 7B.

In block 506, the operator of the environment installs the user interface device in one location of the environment and installs the environmental sensor unit in a second location. The installation of block 506 may be carried out by an unskilled person, such as a person who is not a carpenter, electrician, or other technician. The installation may include, for example, merely placing one of the two devices in the environment. For example, the environmental sensor unit may be placed on a shelf within an interior chamber of a temperature control device such as a refrigeration device, or affixed to a wall of a temperature control device using an adhesive, hook-and-loop fastener, magnets, or other fastener. In some cases in which the environmental sensor unit is positioned inside a temperature control device, the installation of block 506 may include positioning the user interface device outside of that temperature control device. For example, in such a case, the operator of the environment may affix the user interface device to an exterior surface of the temperature control device. In some embodiments, installation of the user interface device and/or the environmental sensor unit may merely require inserting screws through screw mounts integrated into an exterior housing of the device(s) and screwing those screws into a wall in the environment, to affix the device(s) to the wall.

Installation in block 506 may be simple and carried out by an unskilled person because of the wireless communication between the devices. Wireless communication enables the devices to be installed without running wires through an environment to connect devices, which is a source of installation complexity in conventional systems.

In block 508, the operator powers-on both the user interface device and the environmental sensor unit to enable monitoring and display of one or more environmental parameters. The devices may then continue to monitor and display environmental parameters, in accordance with techniques described herein, until the user powers-off the devices or the devices lose power. Accordingly, following the user powering-on the devices, the process 500 ends, but following the process 500 the environmental sensor unit may continue to sense one environmental parameters in the environment and communicate values for the parameter(s) to a base station, server, and/or user interface device.

As discussed above, a user interface device, such as a display device, and an environmental sensor unit may implement a specific wireless communication protocol which they may follow to associate with one another. The specific wireless communication protocol may include exchanging a reduced number of wireless communications to effect the association as compared to other association or pairing protocols. For example, in some embodiments the devices may not exchange messages that are specific to association. As another example, in some embodiments the associating may include only one-way communication, with the display device not transmitting any messages regarding the associating.

Figures 6A, 6B:
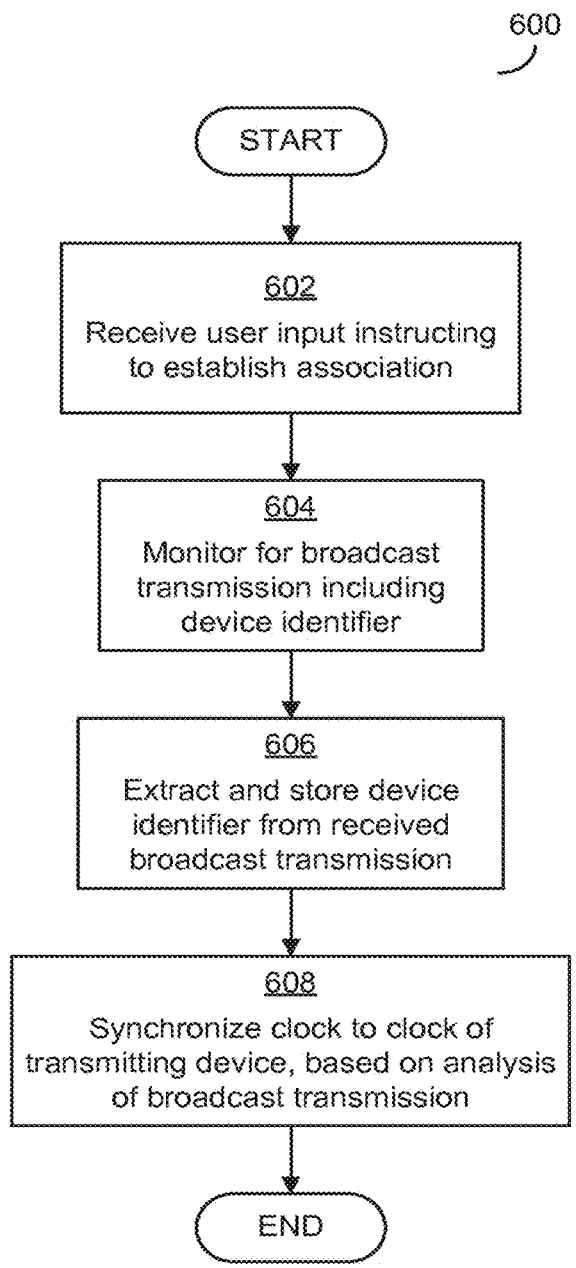
FIGS. 6A and 6B are flowcharts of exemplary processes for operating components of an environmental monitoring system to establish an association.

FIGS. 6A/6B and 7A/7B illustrate two examples of processes that may be implemented by a user interface device and an environmental sensor unit to associate with one another. Embodiments may implement one or both of these example processes and may use either of the processes to form an association between devices. For ease of description, the user interface device will be described as a display device, though it should be appreciated that alternative user interface devices may be used in embodiments, as described above.

The example processes 600, 620 of FIGS. 6A and 6B are implemented by a display device and environmental sensor unit, respectively, to form an association. The processes 600, 620 may be carried out in parallel by the two devices and, as discussed below, include the environmental sensor unit communicating to the display device one or more wireless communications to effect the association.

Prior to the start of the processes 600, 620, one or both of the two devices may have been associated with other device(s). For example, the environmental sensor unit may have been associated with a different display device and the display device may have been associated with a different environmental sensor unit. Alternatively, one or both of the devices may not have been associated with another device.

The process 600 begins in block 602, in which the display device receives user input instructing the display device to establish an association with an environmental sensor unit. The user input received in block 602 may be received via any suitable interface, as embodiments are not limited in this respect. In some embodiments, for example, the display device may have a button that, when operated by a user, instructs the display device to establish an association. If, at the time the user input is received in block 602, the display device is already associated with an environmental sensor unit, the display device firstly responds to the user input by dropping the previously-established association. The display device may drop the previously-established association by, for example, removing from a display content previously received from a previously-associated sensor unit. The display device may also drop the previously-established association by removing from a storage of the display device an identifier for the previously-associated sensor unit. Lastly, while in some embodiments the display device may not include any wireless transmission hardware and thus cannot transmit any wireless communications, in some embodiments the display device may include wireless transmission hardware and may transmit a message to the previously-associated environmental sensor unit informing the previously-associated sensor unit that the association is being dropped.

In addition, in some embodiments, the display device may be maintained in a suspended operation mode at times that the display device is not, for example, monitoring to receive transmissions or updating content of a display. In the suspended operation mode, a processing circuit of the display device may be placed in a mode in which the processing circuit consumes less power than in normal operation. In the suspended operation mode, the processing circuit may not perform any processing save for determining whether a condition for exiting the suspended operation mode is met.

The condition for exiting the suspended operation mode may be, for example, that a time period has passed or that a user input (as in block 602) is received. In the suspended operation mode, a wireless receiver of the display device may also be disabled or otherwise not operated to monitor for transmissions, or transmissions received via an antenna of the wireless receiver are not processed. In response to receiving the user input of block 602, the display device may exit the suspended operation mode.

In block 604, the display device monitors for a transmission from an environmental sensor unit with which to associate. The association of the wireless communication protocol of the example of FIGS. 6A and 6B may consume less power and include an exchange of fewer messages in part because of the simplicity of the protocol. The inventor has recognized and appreciated that an association can be reliably formed between devices without the need for bidirectional communication of multiple messages. Instead, the display device may in block 604 may monitor for a transmission that is in an expected format and/or includes expected content and, upon receipt of the first of such transmissions, form an association with the environmental sensor unit that transmitted that message.

Accordingly, in block 604 the display device begins monitoring for a transmission that has a format and/or content matching a configuration setting of the display device identifying a format or content of message that will be transmitted from a sensor unit during an association process. In the example of FIGS. 6A/6B, the display device monitors for a wireless transmission that indicates that it is a broadcast transmission and that further includes a device identifier.

The wireless transmission may include an indication that it is a broadcast transmission in various ways, depending on an underlying protocol by which the transmission was transmitted. For example, in some embodiments, the message may indicate that it is a broadcast transmission by including a particular flag or recipient address that indicates that it is a broadcast transmission. In other embodiments, each wireless transmission transmitted according to a protocol may have a network identifier identifying a network to which the transmission is being transmitted and a broadcast transmission may include a particular network identifier corresponding to a broadcast transmission.

The display device may also monitor for a transmission including particular content, including a device identifier for an environmental sensor unit. In some embodiments, the display device may only monitor for transmissions including a device identifier, while in other embodiments the display device may monitor for transmissions including additional content. For example, the display device may monitor for transmission including information regarding a configuration of an environmental sensor unit. As will be discussed in further detail below, in some embodiments an environmental sensor unit may be configured to transmit a message indicating its configuration, such as identifying various parameters with which the sensor unit is configured or including other information regarding a current state of the sensor unit (e.g., battery level). The display device may monitor in block 604 for a transmission that is identified as or matches the format of such a message identifying a configuration, or that includes particular content of such a message indicating a configuration.

During the monitoring of block 604, the wireless receiver detects a wireless transmission satisfying the conditions and the display device responds to receipt of the transmission by moving on to block 606. Specifically, as discussed above, the display device responds to receipt of the first such message by moving to block 606. The display device does not analyze the wireless transmissions in block 604 to determine whether any was sent from a particular environmental sensor unit, but instead forms an association with the first environmental sensor unit from which a wireless transmission was detected. In block 606, the display device extracts from the wireless transmission a device identifier for the environmental sensor unit that transmitted the detected transmission and stores the identifier in a storage of the display device. As will be discussed in more detail below in connection with FIG. 8, the display device will use the stored device identifier to identify messages that were transmitted from the associated environmental sensor unit.

In block 608, as an additional part of the association, the display device will synchronize an internal clock to a clock of the environmental sensor unit with which it is associated. As discussed further below in connection with FIG. 8, in some embodiments the display device may only monitor for communications from an associated sensor unit upon expiration of a time interval. It may be important, therefore, to ensure that the clock of the display device and the clock of the environmental sensor unit are aligned so that the display device monitors for transmissions at a same time that the sensor unit is transmitting. To synchronize the clocks, the display device may analyze the transmission received in block 604 to determine information about the clock of the sensor unit that transmitted the transmission. The information about the clock may include a phase of the clock of the sensor unit, which the display device may use in the synchronizing to ensure that the clocks of the two devices are placed in the same phase. The information about the clock may additionally or alternatively include information on a clock rate of the sensor unit, which the display device may use in the synchronizing to ensure that the clocks are incrementing at a same or similar rate and do not drift apart from one another. The information about the clock may additionally or alternatively include a current time indicated by a clock of the sensor unit, such as a current time in hours and minutes or in another format, which may be included in the transmission received in block 604. In this case, the display device may use the current time in the synchronizing to set a current time of the display device to the time indicated by the clock of the sensor unit.

The synchronizing of block 608 may in some embodiments exactly align the clocks of the display device and the associated sensor unit, while in other embodiments the synchronizing may be done within a tolerance. The tolerance may be set by an operator of an environmental monitoring system and may be hardcoded into the devices or received wirelessly from, for example, a server (e.g., server 114 of FIG. 1). The tolerance may vary between environments and applications. In some embodiments, the synchronization tolerance may be that the clocks are aligned to within 500 ms, to within 250 ms, to within 100 ms, to within 50 ms, to within 10 ms, to within 5 ms, or to within 1 ms. Known techniques for synchronizing clocks may be used.

Once the device identifier is stored in block 606 and the clocks are synchronized in block 608, the process 600 ends. Following the process 600, the display device is associated with a sensor unit and may receive communications from the sensor unit using wireless communication protocols as discussed herein, including in connection with FIGS. 8-9. In connection with this communication protocol, the display device may receive data from the environmental sensor unit by, at fixed intervals, monitoring for communications that include the identifier for the associated sensor unit, indicating that the transmissions were transmitted by the associated sensor unit.

In some embodiments, following the associating, the display device may update a display to output an identifier for the associated sensor unit, which may be a serial number or other suitable identifier for the sensor unit. This may aid an operator of the environment in identifying a sensor unit to which the output on the display is relevant.

The association process 600 was not described as establishing the intervals at which the display device will monitor for communications from the sensor device following association. In some embodiments, these intervals may be fixed. In other embodiments, these intervals may be set by a user via input provided to each of the display device and the sensor unit. In other embodiments, the intervals may be configured on the display device via the transmission received in block 604. As discussed above, the transmission received in block 604 may include information on a configuration of the sensor unit and, in some embodiments, the configuration information may include a setting for a communication interval. In this case, as part of the associating the display device may store the communication interval and configure itself to subsequently monitor for communications at that interval. In such embodiments, the sensor device may be configured with the communication interval by user input received at the sensor unit, and/or may be configured by a transmission received from a server of the environmental monitoring system (e.g., server 114 of FIG. 1).

In addition, while not illustrated in FIG. 6A, following the establishment of the association through the process 600, the display device may update content output via a display of the display device to identify the association. The display device may output information regarding the associated sensor unit. For example, the display device may output the identifier for the associated sensor unit received in block 604. The display device may also output via the display configuration information for the associated sensor unit or other information received in the configuration message of block 604, such as battery level information.

Also, for ease of description the process 600 was described with an assumption that a message is received in block 604 and an association follows. There may be cases where, in block 604, the display device monitors for a communication but does not receive a communication. In such cases, the display device may, in some embodiments, continue to monitor until a communication is received. In other embodiments, however, the display device may monitor for only a fixed time interval, such as a certain number of minutes or seconds, after which the display device will stop monitoring. When the display device stops monitoring, the display device may also update content output via a display to indicate that the display is not associated with an environmental sensor unit. The display device may output a message indicating that the association was not successful or otherwise indicate an error. Once the display is updated, in some embodiments the display device may return to the suspended operation mode.

FIG. 6B illustrates a process 620 that may be carried out by an environmental sensor unit in parallel with a display device performing the process 600, to carry out an associating. Accordingly, some of the actions taken by a sensor unit in performing the process 620 will have similarities to actions described above in connection with process 600. For the sake of brevity, the discussion of the process 620 will refer back to the discussion of the process 600.

The process 620 begins in block 622, in which the environmental sensor unit receives user input instructing the sensor unit to establish an association. The user input may be received in any suitable manner, including via a button or other user interface, as embodiments are not limited in this respect. The user input may be an input explicitly directed to forming a new association with a display device (or other user interface device) or may be a user input instructing formation of new associations. As should be appreciated from the discussion of FIG. 1 above, and from the '935 and '372 applications incorporated herein by reference, the environmental sensor unit may have associated with a base station and may additionally have registered with a server of an environmental monitoring system. In some such embodiments, the user input of block 622 may be a user input instructing the sensor unit to establish these associations as well. In some embodiments, prior to the beginning of the process 620, one or more of these associations may have been established by the sensor unit and, in response to the user input instructing the establishment of the association(s), the sensor unit may drop the prior association(s). The sensor unit may drop the prior association(s) in any suitable manner, including as discussed above in connection with block 622 and/or as discussed in the '935 and '372 applications incorporated herein by reference.

In block 624, the environmental sensor unit may respond to the user input by associating with a base station and/or server of an environmental monitoring system. The actions of block 624 may be performed in embodiments in which the user input of block 622 instructs formation of new associations with a display device, base station, and/or server. The environmental sensor unit may associate with the base station and/or server in any suitable manner, including according to techniques described in the '935 and '372 applications incorporated herein by reference.

In block 626, the sensor unit transmits a message including configuration information, which the sensor unit transmits as a broadcast message. Examples of content and/or formatting of the message transmitted in block 626 are discussed above in connection with block 604 of FIG. 6A.

Once the sensor unit transmits the message in block 626, the process 620 ends. As discussed above, in embodiments the display device may not transmit messages to the sensor unit during association, and may not include any wireless transmission hardware at all. Accordingly, as part of the association process 620, the environmental sensor unit may not receive any information from the display device and therefore may not store information identifying the display device or otherwise indicating the association with the display device.

As mentioned above, FIGS. 6A and 6B illustrate one example of a manner in which a display device and an environmental sensor unit may establish an association. FIGS. 7A and 7B illustrate a second example of such a process.

In the example of FIGS. 6A and 6B, the association was established in response to user input. FIGS. 7A and 7B are similar in that a start of an association process is triggered by a condition, but differ in the condition that triggers the start of the association process. In the example of FIGS. 7A and 7B, the environmental sensor unit may be adapted to transmit two types of signals and the display device may correspondingly be adapted to receive the two types of signals. The sensor unit and display device may have separate hardware for the transmission and reception of the two types of signals. One of the two types of signals may be a radio frequency signal, such as the wireless network signals discussed above. The other type of signal may be a light signal, such as an infrared signal. In embodiments operating in accordance with FIGS. 7A and 7B, the association process is triggered through transmission and reception of the second of these types of signals, such as the transmission by the sensor unit of an infrared signal and the reception by the display device of the infrared signal. (For ease of description, the second type of signal will be described below as an infrared signal, but it should be appreciated that other types of signals may be used.) Otherwise, there are similarities between the examples of FIGS. 6A/6B and 7A/7B and, as such, the example of FIGS. 7A/7B will be described with reference to the discussion above of FIGS. 6A/6B.

As discussed above in connection with FIGS. 2-3, in some embodiments a sensor unit and a display device may include complementary latches to hold the devices in proximity to or contact with one another. In some such embodiments, an infrared emitter on the sensor unit and an infrared receiver on the display device may be positioned on the devices such that when the latches are engaged and the devices are held near one another, the infrared emitter aligns with the infrared detector. For example, if the latches are designed to hold a certain area of a rear surface of a display device adjacent to a certain area of a front surface of a sensor unit, the infrared detector may be positioned on the display device in the certain area of the rear surface and the infrared emitter may be positioned in the certain area of the front surface. As briefly mentioned above and as should be appreciated from the discussion below, an association process is triggered by the transmission/reception of an infrared signal. Accordingly, in these embodiments, rather than using a user input to trigger association (as in the example of FIGS. 6A/6B), the user need only latch the display device to the sensor unit with which it is to pair (or otherwise position the display device adjacent to the sensor unit) to trigger the association.

Figure 7A:
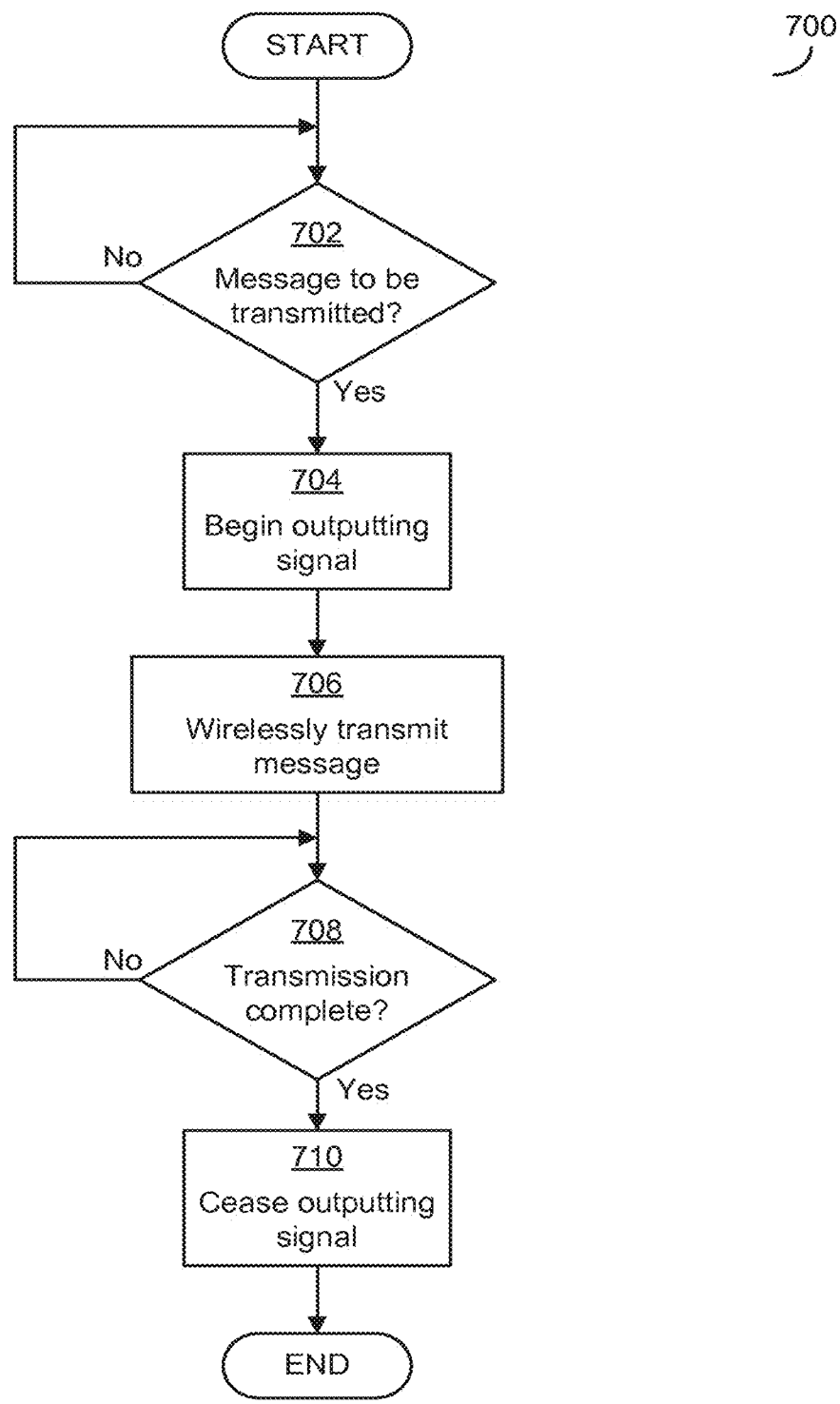
FIGS. 7A and 7B are flowcharts of examples of alternative processes for operating components of an environmental monitoring system to establish an association.
Figure 7B:
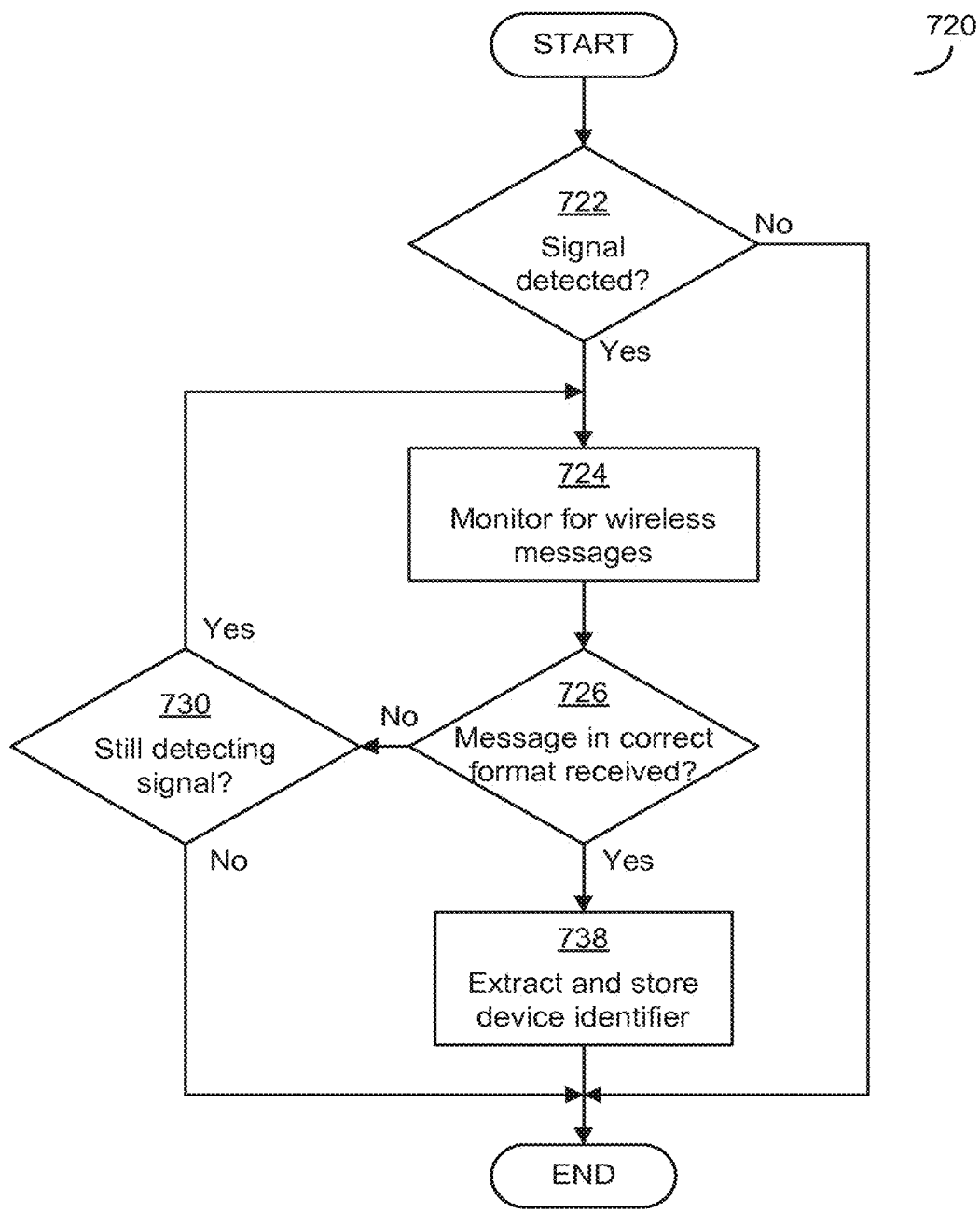

FIG. 7A illustrates a process 700 that is implemented by a sensor unit. Prior to the start of the process 700, the sensor unit may have been installed in an environment by an operator of that environment, monitored one or more environmental parameters, and communicated values for those environmental parameters to a server (such as via a base station and/or one or more other environmental sensor units, with which the sensor unit may have associated), as described in the '935 and '372 applications incorporated herein by reference.

The process 700 begins in block 702, in which the sensor unit determines whether the sensor unit is to wirelessly transmit a message (via the first type of signal the sensor unit is adapted to transmit), such as a message to a base station, another sensor unit, or a server. In the embodiment of FIG. 7A, no messages specific to forming an association between the sensor unit and a display device may be transmitted by the display device, but instead other messages transmitted by the sensor unit for other purposes may be used in the association. Accordingly, in block 702, the sensor unit determines whether any message is to be transmitted, or whether a particular type of message is to be transmitted or a message is to be transmitted to a particular destination (e.g., base station, server, other environmental sensor unit). The message may be of any suitable format, including any of the signals described in any of the '935, '971, '051, '372, '040, and the '791 applications incorporated herein by reference. The message that is transmitted, however, may be one that includes a device identifier for the sensor unit.

If no message is to be transmitted, the sensor unit continues to wait for a message to be transmitted. If, however, the sensor unit determines that a message is to be transmitted via the first type of transmitter of the sensor unit (in the example of FIG. 7A/7B, a radio frequency signal), then the sensor unit moves on to block 704.

In block 704, the sensor unit begins outputting a second type of signal, which is in the example of FIGS. 7A/7B an infrared signal output via an infrared emitter. The infrared signal may be any suitable signal, such as a mere output of light or data modulated into the light in any suitable manner. The sensor unit continues to emit infrared light from the infrared emitter throughout the transmission of the RF signal. Accordingly, in block 706 the sensor unit transmits the RF signal that was identified in block 702, which includes a device identifier for the sensor unit. The sensor unit then determines, in block 708, when the transmission of the message in the RF signal is complete. Once the transmission is complete, in block 710 the sensor unit ceases transmitting the infrared signal, and the process 700 ends.

FIG. 7B illustrates a process 720 that is performed by a display device in parallel with a sensor unit performing the process 700 of FIG. 7A. As with the process 600 of FIG. 6A, prior to the start of the process 720, the display device may be in a suspended operation mode and/or may have previously established an association with another environmental sensor unit. In accordance with the example of FIGS. 7A/7B, a condition for triggering the display device to perform the association process 720 is receipt of an infrared signal via an infrared receiver (or receipt of another type of signal, as discussed above). Accordingly, the process 720 begins in block 722, in which the display device determines whether an infrared signal has been received via the infrared receiver. If not, the process 720 ends and no new association is established. If, however, the infrared receiver receives an infrared signal, then the display device begins an association process. As should be appreciated from the discussion above of process 600 of FIG. 6A, at a start of an association process the display device may enter a normal operating mode from a suspended operation mode, and may additionally drop a prior association, both of which may be done using techniques described above in connection with block 602 of FIG. 6A.

In block 724, in response to receiving the infrared signal, then in block 724 the display device begins monitoring for wireless messages in block 724 using a wireless receiver for receiving a first type of messages such as RF messages. The display device begins monitoring for wireless messages in block 724 in response to receiving the infrared signal because, as discussed above in connection with blocks 702-710 of FIG. 7A, the sensor unit signals transmission of the wireless messages by transmission of the infrared signal. The messages for which the display device monitors may be messages that have a format and/or content that matches an expected format/content with which the display device is configured. For example, the display device may monitor for messages that are transmitted to a base station, environmental sensor unit, or server in accordance with techniques described in any of the '935, '971, '051, '372, '040, and the '791 applications incorporated herein by reference. The message may, for example, include a device identifier for an environmental sensor unit. In block 726, the display device determines whether a message in the correct format (and/or having the correct content) has been received. If so, then the display device responds by, in block 738, extracting a device identifier for the environmental sensor unit that transmitted the received message and storing that identifier. By storing the identifier, the display device associates with that sensor unit and will subsequently monitor for messages transmitted by that sensor unit. While not illustrated in FIG. 7B, in block 738 the display device may additionally carry out other elements of an association process as described above in connection with FIG. 6A, including synchronizing clocks and configuring communication intervals, or other elements. Once the association process is complete, the process 720 ends.

If, however, in block 726 the display device determines that a message in the correct format (and/or having correct content) has not been received, then the display device may continue monitoring for a message. However, as should be appreciated from the foregoing, the trigger for an association process in the example of FIGS. 7A/7B is receipt of the infrared signal and the infrared signal is transmitted by the sensor unit during transmission of wireless messages. Once the infrared signal is no longer being received from the sensor unit, then, the wireless messages are no longer being transmitted from the sensor unit. Accordingly, if the display device determines that the infrared receiver is no longer receiving an infrared signal, then the process 720 ends. In this case, as in the example of FIG. 6A discussed above, the display device may update content output via a display to indicate that no association was established or otherwise indicate an error and the display device may enter a suspended operation mode.

Through the processes 700, 720 of FIGS. 7A-7B, an association may be established between a sensor unit and a display device. As a result of the association, the two devices may communicate with one another in accordance with wireless communication protocols described herein. In particular, the sensor unit may transmit messages and the display device will filter received messages and only process messages received from the associated sensor unit. In addition, to reduce complexity of a communication protocol, reduce the number of messages sent and the time spent by devices monitoring for communications, and reduce power consumption, the devices may additionally communicate only at fixed intervals. The fixed intervals, as discussed above, may be hardcoded by a provider of the sensor unit and the display device, such as operator of an environmental monitoring system, or may be configured by user input and/or by input from a server. As should be appreciated at least from the '935 and '372 applications incorporated herein by reference, the environmental sensor unit may also communicate at time intervals with a base station and/or server. In embodiments, the time interval by which the environmental sensor unit communicates with a display device may be different from (such as being shorter than) a time interval by which the environmental sensor unit communicates with a server and/or base station.

Figure 8:
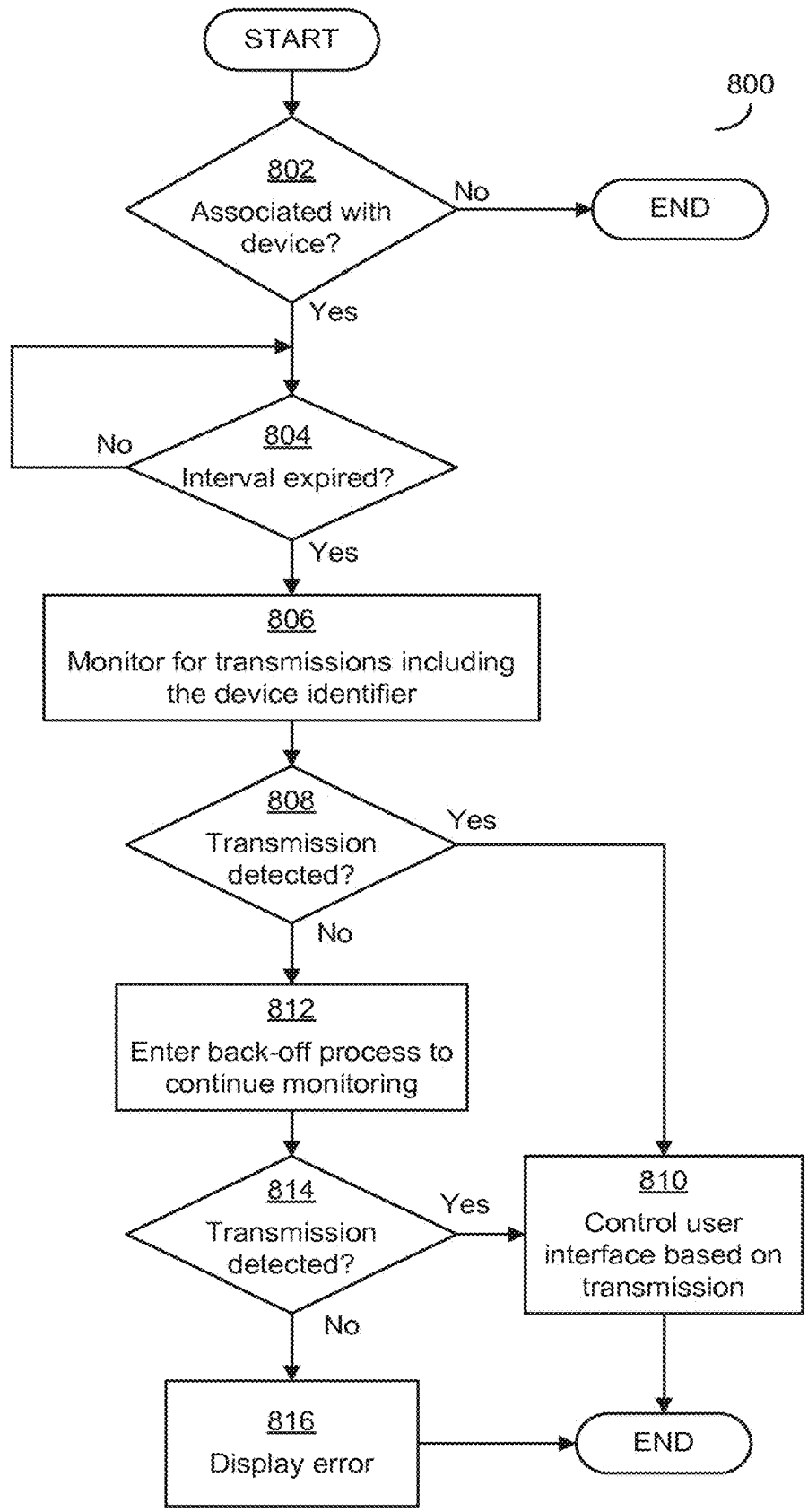
FIG. 8 is a flowchart of an exemplary process for operating a user interface device to monitor for messages transmitted from an associated device and display information extracted from received messages.

FIG. 8 illustrates an example of a process 800 that may be implemented by a display device to receive communications from an associated environmental sensor unit. Prior to the start of the process 800, the display device may be associated with an environmental sensor unit, such as prior to installation by an operator of an environmental monitoring system and/or through an association process such as the ones described in connection with FIGS. 6A/6B and 7A/7B. The process 800 therefore begins in block 802, in which the display device determines whether it is associated with an environmental sensor unit. If not, then there is no device from which to receive communications during the process 800, and the process 800 ends.

If, however, the display device determines in block 802 that the display device is associated with an environmental sensor unit, then in block 804 the display device waits for an interval of time to pass. As should be appreciated from the foregoing, the environmental sensor unit will transmit communications to the display device at intervals and, as such, the display device will under normal operation only monitor for wireless communications at those intervals. In block 804, therefore, the display device will wait until the time interval has passed, either since first association or since the last communication, to monitor for wireless transmissions. Until that time, and during the loop of block 804, the display device may be placed into a suspended operation mode. As discussed above in connection with FIG. 6A, in the suspended operation mode the display device may not be carrying out operations. A processing circuit of the display device may not perform processing apart from determining whether one or more conditions for exiting the suspended operation mode are met, such as determining whether the time interval has passed. During the suspended operation mode, a wireless receiver may also not be operated by the display device, or wireless communications received by an antenna of the wireless receiver may not be processed by the display device.

When the display device determines in block 804 that the time interval has expired, then the display device may exit the suspended operation mode and enter a normal operation mode in which, for example, the processing circuit is performing operations to determine whether communications have been received and whether the content output via the display should be updated. In block 806, the display device operates a wireless receiver to monitor for wireless transmissions including a device identifier identifying the associated environmental sensor unit as the transmitter of the transmission. The display device may additionally evaluate the transmissions to determine whether transmissions are in an expected format and/or have other expected content, or satisfy other conditions relating to the form or content of the messages. For example, the display device may monitor for transmissions sent according to a stateful protocol and/or that are formatted with a set of elements that are pairs of parameter identifiers and values, such as using formats described at least in the '935 and '372 applications incorporated herein by reference.

In block 808, the display device determines whether a transmission meeting the condition(s) was received in block 806. If so, then in block 810 the display device extracts from the transmission information included in the message and controls an output of data via the display based on the information in the message. An example of a manner in which the display device may control output via a display is described below in connection with FIG. 10. The information that is extracted in block 810 may include any suitable information that may be transmitted by the environmental sensor unit, as embodiments are not limited in this respect. For example, the environmental sensor unit may transmit to the display device one or more values of environmental parameters sensed by the environmental sensor(s) of the sensor unit. The values may be transmitted together with identifiers for the parameters to which the values correspond. The values may also be transmitted with an identifier for a sensor that produced the value, such as a serial number for the sensor, which may be advantageous in embodiments in which strict regulations require the logging of sensors that produced the values. The values may be transmitted together with information indicating a time at which the values were sensed by the sensors. This information that is received by the display device from the sensor unit in the transmission will be used by the display device to control output of the display, which may include outputting the information upon receipt, among other approaches described below in connection with FIG. 10. Once the user interface is controlled in block 810, the process 800 ends.

If the transmission is not detected in block 808 following a period of time (which may be different from the interval), then the display device enters a back-off process to continue monitoring. Through the back-off process, the display device attempts to re-synchronize with the associated sensor unit and receive transmissions from the associated sensor unit, but may do so following a protocol that limits an amount of time the display device spends monitoring for transmissions by alternating between periods of time in which the display device is monitoring and not monitoring for transmissions. It may be advantageous in scenarios to continuously monitor until re-synchronization is achieved, however, this may consume a great deal of power and thus may instead be disadvantageous in some scenarios. Accordingly, in some embodiments, in the back-off process of block 812, the display device may alternate between periods of monitoring and not monitoring via a wireless receiver, to conserve power.

The display device may be configured to switch between periods of monitoring and not monitoring according to a schedule with which the display device is configured. For example, a schedule may lay out a sequence of periods of time, which may differ in length, in which the display device monitors and then subsequently does not monitor for wireless transmissions. An example of a schedule follows, but it should be appreciated that embodiments are not limited to a specific schedule or a specific sequence of periods of time.

In one example schedule of a schedule that may be followed during a back-off period, a communication interval by which the sensor unit typically sends data to a display device is 5 minutes. In block 812, during the back-off period, the display device may initially stay on for an extended period, monitoring for transmissions as in block 806. The extended period may be a multiple of the communication interval, such as 30 or 60 minutes. If no transmission is detected during that extended period, then the schedule indicates that the display device will return to following that interval and return to a suspended operation mode and wake again following that same 5-minute time interval (as counted from the last time the display device initially determined in block 804 last time interval had passed and woke from the suspended operation mode). If, after one or more iterations of the same 5-minute time interval, the display device still has not detected a wireless transmission, then to conserve power the display device may begin monitoring only after expirations of longer periods, which may be multiples of that initial interval to stick to an initial schedule, such as at 10 or 15 minute intervals. The schedule may lay out a maximum time by which the display device will alternate between periods of monitoring and not monitoring following staying on for the extended period at the start of the schedule. In one example, the extended period at the start of the schedule may be 60 minutes and the alternating period following the extended may be another 60 minutes.

If, at any time during the schedule, a transmission is detected, then (as shown in in block 814) the display device will move to control the display in accordance with that transmission. The display device may additionally, in that case, re-synchronize a clock of the display device to a clock of the sensor unit as discussed in connection with FIG. 6A, to mitigate the risk of missing a communication in the future.

If, however, no transmission is detected during the back-off process, then in block 816 the display device controls the display to output an error message that no communication has been received from the sensor unit and then enters the suspended operation mode, and the process 800 ends.

As a result of the process 800, the display of the display device may output (as discussed in detail below in connection with FIG. 10) information on environmental parameters sensed for an environment or otherwise output information received from the environmental sensor unit. In some embodiments, the information received from the environmental sensor unit may include information transmitted to the environmental sensor unit from other components of an environmental monitoring system. As should be appreciated from the foregoing, through the association process, a display device may only monitor for communications transmitted by an associated sensor unit. As a result, in some embodiments no other component of the environmental monitoring system may be able to communicate wirelessly to the display device. For other components to output information via the display device, then, those components may communicate information to the display device via the associated environmental sensor unit.

Figure 9:
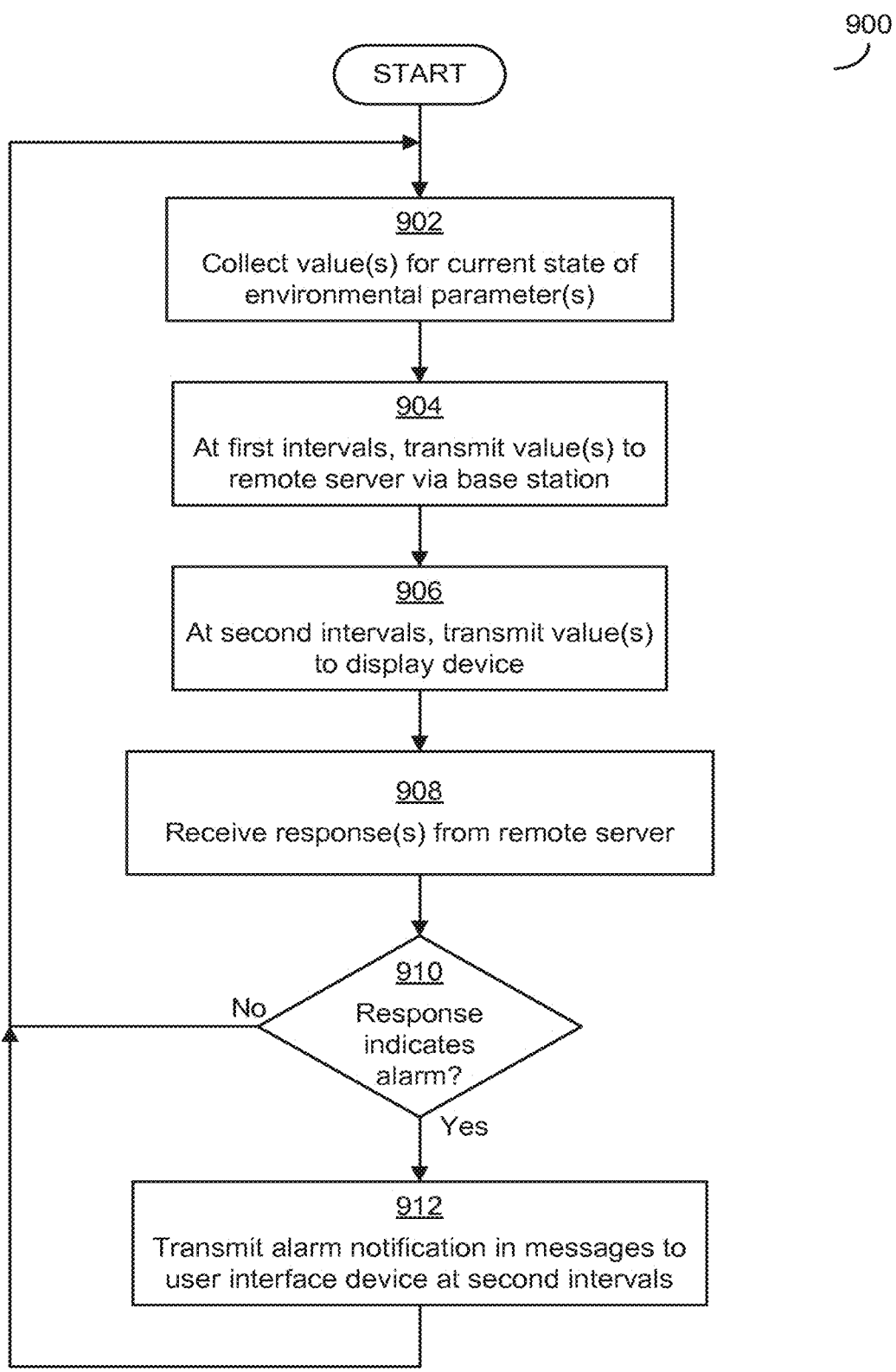
FIG. 9 is a flowchart of an exemplary process for transmitting information regarding environmental parameters from a sensor unit.

FIG. 9 illustrates an example of a process that may be implemented by an environmental sensor unit for relaying information to an associated display device. In the example of FIG. 9, the information that is relayed includes information on an alert. As should be appreciated at least from the '935 application incorporated herein by reference, an environmental monitoring system may be configured with alarm conditions that, when satisfied, cause an alert to be output to an operator of an environment. The alarm conditions may relate to proper operating ranges for environmental parameters such that when an environmental parameter strays outside of a proper operating range, or otherwise deviates from a proper value, the alert may be output to the operator of the environment. The applications incorporated herein by reference identify various ways in which an alert may be output. Additionally or alternatively, using the process of FIG. 9, such an alert may be output via a display device.

Prior to the start of the process 900 of FIG. 9, an environmental sensor unit may associate with a display device, such as using association processes discussed above. In addition, the environmental sensor may be disposed in an environment with sensors to monitor environmental parameters, and may have registered with or otherwise associated with one or more other environmental sensor units, one or more base stations, and/or a server to transmit information to other components of an environmental monitoring system. The sensor unit may interact with these other components of the environmental monitoring system in accordance with techniques described in applications incorporated herein by reference, including in the '935 application and the '372 application.

The process 900 begins in block 902, in which the environmental sensor unit operates its sensor(s) to collect one or more values for one or more environmental parameters. In block 904, at a first reporting interval that may have been set by a server of the environmental monitoring system, the sensor unit transmits one or more messages to a base station and/or the server (and/or via one or more other sensor units) to inform the server of the values of the environmental parameter(s). In addition, at second intervals that may be different from (including shorter than) the first reporting interval, the sensor unit may in block 906 transmit the values of the one or more environmental parameters to the display device, as discussed above. In block 906, in some embodiments, the sensor unit may transmit the values twice in two messages, one following the second. In these embodiments, the sensor unit may transmit the values twice to attempt to communicate reliably with a display device, in spite of the sensor unit and the display device being slightly out of phase with one another such that the second interval of the display device is not precisely timed to the second interval of the sensor unit. In such embodiments, the second transmission of block 906 may be a duplicate of the first and may follow the first by any suitable amount of time, as embodiments are not limited in this respect. In addition, in block 908, the sensor unit may receive from the server responses to the transmissions of block 904, which may be in the form of messages confirming receipt of the transmissions of block 904.

As should be appreciated from the applications incorporated herein by reference, the transmissions and receptions of block 904, 906, and 908 may be carried out in accordance with a stateless, best effort protocol, such as UDP. The responses received in block 908 may be UDP messages that confirm receipt, rather than being explicit acknowledgement messages. In some cases, the confirmations received in block 908 may include additional information configuring the sensor unit or otherwise indicating information regarding the environmental parameters or the environmental monitoring system. For example, the confirmation message may include a value changing the first reporting interval used in block 904. As another example, the confirmation messages may indicate whether a value of an environmental parameter satisfies an alarm condition and, if so, which environmental parameter.

The sensor unit determines in block 910 when confirmation messages received in block 908 indicate an alarm condition is satisfied by an environmental parameter. If not, then the process 900 loops back to block 902 and the sensor unit continues monitoring environmental parameters. If, however, the sensor unit determines that the confirmation received from the server indicates an alarm condition for an environmental parameter, then in block 912 the sensor unit transmits a message to the display device identifying the environmental parameter (and/or the sensor that produced the value for that environmental parameter) and indicating the alert. As should be appreciated from the foregoing, the display device may only be monitoring for transmissions at fixed intervals, such as the second interval used in block 906. Accordingly, the sensor unit waits until the next expiration of the second interval to send the alert message in block 912. By the time the next expiration of the second interval arrives, the sensor unit may, in some cases, have operated its sensors to sense new values for one or more of the environmental parameters and, as such, the alert may be combined in a message with information regarding other values of other environmental parameters, or other information. Once the alert is communicated in block 912, the process 900 loops back to block 902 and the sensor unit continues monitoring the environmental parameter(s).

Depending on the lengths of the first and second intervals, in some cases it is possible that before the sensor unit transmits an alert to the display device, the sensor unit may have collected an updated value for that environmental parameter for which the alert was generated and communicated that new value to the server, and received in response a new confirmation that indicates that the alarm is no longer applicable. In this case, the sensor unit may be configured not to transmit the alert to the display device. Rather, in some embodiments, upon an expiration of the second time interval, the sensor unit may be configured to collect most recent values collected for one or more environmental parameters and one or more alerts that are still active at that time, and transmit those values and alerts to the display device in one or more messages.

As a result of the process 900, the display device receives messages from an associated sensor unit that indicate values of one or more environmental parameters and that may indicate an alert, among other information (discussed above) that may be transmitted such as times, battery levels, serial numbers, or other information. That information is transmitted to the display device for output via the display.

In some embodiments, that information may be output upon receipt by the display device. However, as discussed above, the inventor has recognized and appreciated that updating content output via a display is a relatively large consumer of power in an environmental monitoring system. This may be particularly the case in embodiments in which a display is implemented as an electronic paper display, such as an electrophoretic display, where the display draws little power outside of when a content is being changed. As such, it may be advantageous in embodiments not to update the display upon receipt of every new value.

Figure 10:
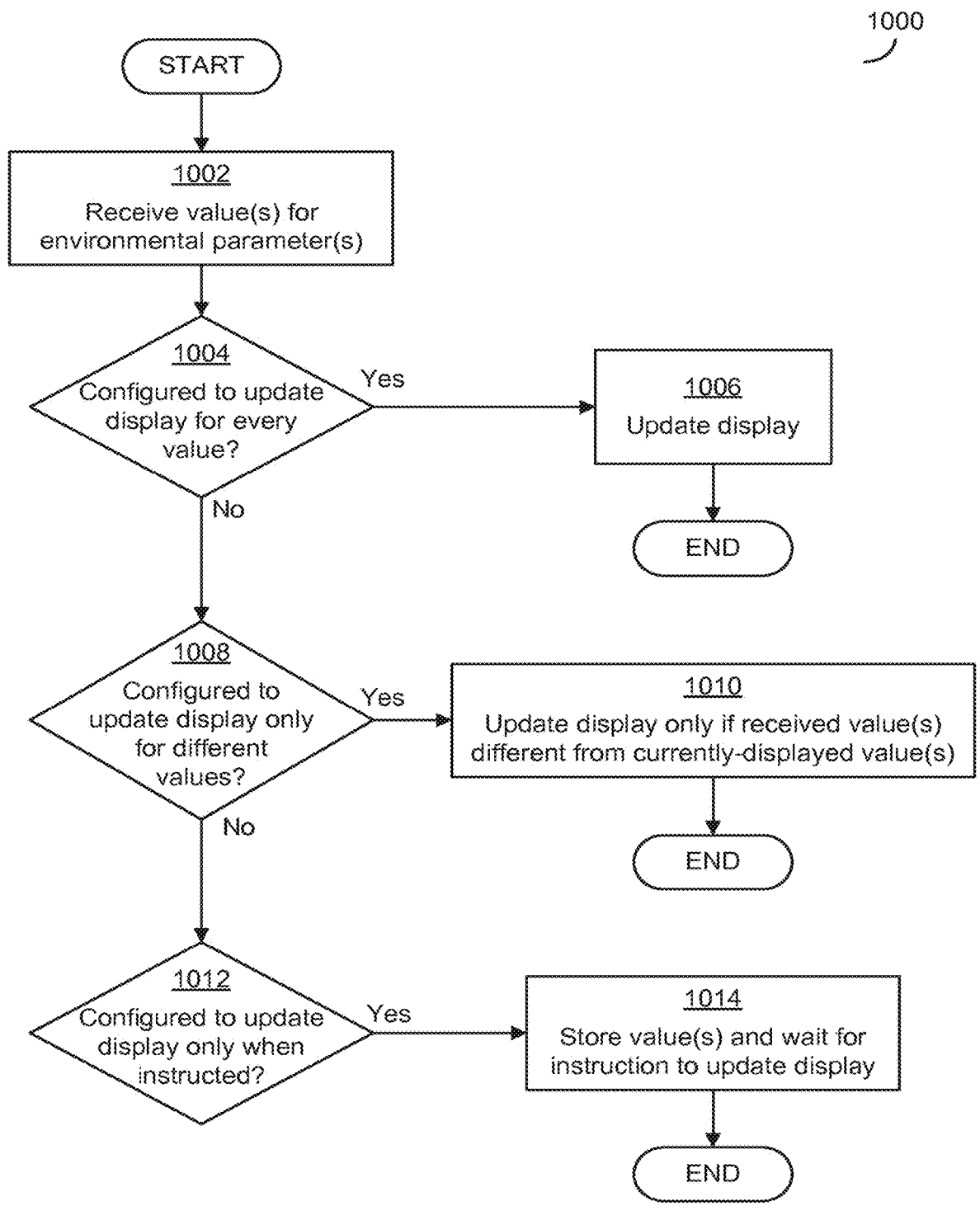
FIG. 10 is a flowchart of an exemplary process for determining whether to update a display of a user interface device to display information received from an environmental sensor unit.

FIG. 10 illustrates an example of a process by which a display device may be configured to control a display, such as by controlling when to update content output via the display. Prior to the start of the process 1000, a display device and a sensor unit may be installed in an environment and associated with one another, and the sensor unit may begin monitoring one or more environmental parameters of the environment. As will be appreciated from the discussion of the process 1000 below, the process 1000 may control a display in various ways depending on a configuration of the display device. Accordingly, in some embodiments, prior to the start of process 1000 a configuration input may be received at the display device that configures the display device to use one of the ways described below in connection with process 1000. The configuration input may be received in any suitable manner, such as via a wireless transmission received from an associated environmental sensor unit and/or via a user interface of the display device.

The process 1000 begins in block 1002, in which the display device receives a transmission from the associated sensor unit that includes values for environmental parameters. Following receipt of the transmission, the display device controls the display in accordance with its configuration. Blocks 1004-1014 describe the various ways in which, in the example of FIG. 10, the display device may control the display.

In block 1004, the display device determines whether it is configured to update content output via the display following receipt of every transmission and every value for an environmental parameter. If so, then in block 1006 the display device controls the display to update the content output via the display based on the transmission received in block 1002. As should be appreciated from the foregoing, the display device may output (in block 1006 and in blocks 1010, 1014) via the display an identification of one or more environmental parameters, values for those environmental parameters, times at which those values for environmental parameters were generated, identifiers (e.g., serial numbers) for sensors used to generate the values, an identifier (e.g., serial number) for the associated sensor unit, or other information regarding the environment or environmental sensor unit. Once the content of the display is updated and displayed, the process 1000 ends.

If, however, the display device determines in block 1004 that it is not configured to update the display for every received transmission, then in block 1008 the display device determines whether it is configured to update the display for transmissions that include values for environmental parameters that are different from currently-output values. As discussed above, some displays (e.g., electrophoretic displays) may consume much more power when changing content than when simply outputting the content, and it may be advantageous to refrain from changing the content when possible. Accordingly, in some embodiments it may be advantageous to drive changes to the output of the screen only when the values of the parameters, which may be the most important content to some operators of environments, has changed. If the display device is configured in this way, then in block 1010 the display device determines whether any of the values of the one or more environmental parameters is different from currently-output values. If not, then the display device may not update the content on the display. If, however, any of the values is different from a currently-output value, then the display device may drive the display to change some or all of the content on the screen, to output some or all of the information received in block 1002. Once the display device determines whether to update the screen and updates the screen, the process 1000 ends.

If, however, the display device determines in block 1008 that the display device is not configured in this manner, then the display device continues to block 1012, in which the display device determines whether it is configured to update the display only when instructed to update the display by a user. As mentioned above, updating the display may be costly in terms of power consumed, and the inventor has recognized and appreciated that it may be advantageous in some embodiments to permit operators of environments to elect when to update the screen, to reduce power consumption and potentially extend the life of batteries of the devices. If the display device is so configured, then in block 1014 the display device stores the value(s) received in block 1002 (and any other information received in block 1002 that may be output) and awaits user input requesting an update to the display. When the user input is received, which may be received via any suitable user interface such as a button, the display device may retrieve the most-recently-stored data from the storage (as, in some cases, the data may be overwritten by data received before the user input was provided) and change the output of the display based on that most-recently-stored data. Once the information is stored in block 1014, the process 1000 ends.

As discussed above in connection with FIG. 9, in some embodiments a transmission from a sensor unit to an associated display device may include an alert message. In some such embodiments, the alert message may be output in accordance with the configuration of the display device, as in the process 1000 of FIG. 10. In other embodiments, however, the display device may be configured to respond to an alert message by overriding the configuration and outputting the alert message upon receipt. In addition, if an alert message is being output for an environmental parameter and a transmission is received that does not indicate an alert for that environmental parameter or otherwise indicates that the alert is no longer applicable, the display device may respond by updating the display to remove the alert, regardless of the configuration.

Techniques operating according to the principles described herein may be implemented in any suitable manner. Included in the discussion above are a series of flow charts showing the steps and acts of various processes that wirelessly communicate between components of an environmental monitoring system using protocols that may reduce power consumption of the system. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 1006 of FIG. 10 described below (i.e., as a portion of a computing device 1000) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 1, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. An apparatus for use with an environmental monitoring system to monitor one or more environmental parameters of an environment, the environmental monitoring system comprising the apparatus located in the environment, at least one environmental sensor unit to sense the one or more environmental parameters and located in the environment, and at least one computing device located remote from the environment, the apparatus being separate and distinct from the at least one environmental sensor unit and the at least one computing device and comprising:
 a housing;
 a display integrated with the housing;
 a wireless receiver;
 at least one processor disposed in the housing; and
 at least one storage medium disposed in the housing, the at least one storage medium having encoded thereon executable instructions that, when executed by the at least one processor, cause the at least one processor to carry out a method comprising:

in response to detecting that a first period of time has passed,
monitoring, using the wireless receiver of the apparatus, for a wireless transmission comprising a device identifier of a first environmental sensor unit, of the at least one environmental sensor unit, with which the apparatus is associated;
in response to receiving, using the wireless receiver of the apparatus, the wireless transmission comprising the device identifier for the first environmental sensor unit,
determining from the wireless transmission a value of an environmental parameter of the one or more environmental parameters, and
controlling the display of the apparatus to present information indicative of the value of the environmental parameter.

2. The apparatus of claim 1, wherein monitoring for the wireless transmission comprising the device identifier of the first environmental sensor unit comprises monitoring for a wireless transmission comprising an indication that the wireless transmission is a broadcast transmission and further comprising the device identifier.

3. The apparatus of claim 1, wherein the method further comprises:
establishing an association between the apparatus and the first environmental sensor unit of the at least one environmental sensor unit, wherein establishing the association comprises:
in response to satisfaction of a condition, monitoring, using the wireless receiver of the apparatus, for wireless transmissions from the at least one environmental sensor unit;
in response to receiving a wireless transmission from the first environmental sensor unit first following start of the monitoring for wireless transmissions from the at least one environmental sensor unit, associating the apparatus with the first environmental sensor unit based on the wireless transmission that is received first from the first environmental sensor unit, wherein the wireless transmission that is received first from the first environmental sensor unit comprises an indication that the wireless transmission is a broadcast transmission and comprises the device identifier for the first environmental sensor unit, and wherein the associating comprises storing the device identifier for the first environmental sensor unit in the at least one storage medium of the apparatus.

4. The apparatus of claim 3, wherein monitoring, in response to satisfaction of a condition, comprises monitoring in response to receipt of an instruction from a user to establish the association.

5. The apparatus of claim 3, wherein associating the apparatus with the first environmental sensor further comprises:
determining, from the wireless transmission that is received from the first environmental sensor unit following the start of the monitoring, a phase of a clock of the first environmental sensor unit; and
synchronizing a clock of the apparatus to the clock of the first environmental sensor unit based on the phase determined from the wireless transmission.

6. The apparatus of claim 1, wherein the method further comprises, in response to detecting that the first period of time has passed:
prior to the monitoring, waking from a suspended-operation mode; and
in response to receiving the wireless transmission and following the controlling, returning to the suspended-operation mode.

7. The apparatus of claim 6, wherein the method further comprises, in response to detecting that the first period of time has passed:
in response to determining, following a second period of time, that the wireless transmission comprising the device identifier for the first environmental sensor unit has not been received,
returning to the suspended-operation mode; and
in response to determining, at a second time, that the first period of time has passed since it was detected that the first period of time has passed, monitoring, using the wireless receiver, for the wireless transmission comprising the device identifier of the first environmental sensor unit.

8. The apparatus of claim 7, wherein the method further comprises, following the monitoring for the wireless transmission after the second time:
in response to determining, following the second period of time, that the wireless transmission comprising the device identifier for the first environmental sensor unit has not been received, monitoring, using the wireless receiver, for the wireless transmission comprising the device identifier of the first environmental sensor unit for up to a third period of time, the third period of time being longer than the second period of time.

9. The apparatus of claim 8, wherein the method further comprising, following the monitoring for the third period of time:
in response to determining that the wireless transmission comprising the device identifier for the first environmental sensor unit has not been received,
displaying an error message on the display, and
returning to the suspended-operation mode.

10. The apparatus of claim 9, wherein the method further comprises:
in response to receiving, during the monitoring for up to the third period of time, the wireless transmission comprising the device identifier of the first environmental sensor unit,
determining, from the wireless transmission that is first received following the start of the monitoring for wireless transmissions, information regarding a clock of the first environmental sensor unit; and
synchronizing a clock of the apparatus to the clock of the first environmental sensor unit based on the information, determined from the wireless transmission, regarding the clock of the first environmental sensor unit.

11. The apparatus of claim 1, wherein:
the method further comprises, in response to receiving, using the wireless receiver of the apparatus, the wireless transmission comprising the device identifier for the first environmental sensor unit, determining whether to update the display of the apparatus, wherein determining whether to update the display of the apparatus comprises determining whether the value of the environmental parameter is different from a previously-received value for the environmental parameter;
controlling the display of the apparatus comprises updating the display to output the value of the environmental parameter in response to determining that the value of the environmental parameter is different from the previously-received value; and controlling the display of the apparatus comprises, in response to determining that the value of the environmental parameter is not different from the previously-received value, refraining from updating the display to output the value of the environmental parameter.

12. The apparatus of claim 1, wherein:
the method further comprises, in response to receiving, using the wireless receiver of the apparatus, the wireless transmission comprising the device identifier for the first environmental sensor unit, storing the value of the environmental parameter in the at least one storage medium of the apparatus; and
controlling the display of the apparatus comprises updating the display to output the value in response to receiving, following receipt of the wireless transmission, a user input instructing update of the display.

13. The apparatus of claim 12, wherein:
the method further comprises, in response to receiving, using the wireless receiver of the apparatus, the wireless transmission comprising the device identifier for the first environmental sensor unit, determining from the wireless transmission a time at which the value of the environmental parameter was determined; and
controlling the display of the apparatus comprises controlling the display to present information indicative of the value of the environmental parameter and the time at which the value was determined.

14. The apparatus of claim 1, wherein:
controlling the display of the apparatus comprises updating the display in response to a condition being met; and
the method further comprises receiving a configuration input setting the condition upon which the display is to be updated in the controlling, the condition being one of receiving via the wireless receiver of the apparatus a wireless transmission including a value of an environmental parameter, receiving via the wireless receiver of the apparatus a wireless transmission including a value of an environmental parameter that differs from a previously-received value for the environmental parameter, and receiving a request via a user interface to update the display.

15. The apparatus of claim 14, wherein receiving the configuration input comprises receiving the configuration input via a second wireless transmission received, via the wireless receiver, from the first environmental sensor unit with which the apparatus is associated.

16. The apparatus of claim 1, wherein the method further comprises:
in response to determining that the wireless transmission indicates that the value of the environmental parameter of the one or more environmental parameters satisfies an alert condition, outputting an alert via the display.

17. The apparatus of claim 1, wherein:
the environment comprises a piece of equipment;
the apparatus is disposed outside the piece of equipment; and
at least the first environmental sensor unit is disposed inside the piece of equipment.

18. The apparatus of claim 17, wherein:
the piece of equipment is a refrigeration device comprising a chamber that is cooled to a temperature lower than that of an ambient temperature of the environment in which the refrigeration device is positioned; and
the first environmental sensor unit is disposed in the chamber.

19. The apparatus of claim 1, wherein:
the wireless receiver is not a wireless transceiver; and
the apparatus does not include any wireless transmitter.

20. A system for monitoring one or more environmental parameters of an environment, the system comprising:
the apparatus of claim 1; and
the first environmental sensor unit, wherein the first environmental sensor unit comprises:
at least one wireless transceiver;
at least one environmental sensor;
at least one second processor; and
at least one second storage medium having encoded thereon executable instructions that, when executed by the at least one second processor, cause the at least one second processor to carry out a second method comprising:
sensing the environmental parameter using the at least one environmental sensor; and
in response to detecting that the first period of time has passed,
transmitting, via the at least one wireless transceiver of the first environmental sensor unit, the wireless transmission comprising the device identifier for the first environmental sensor unit and the value of the environmental parameter sensed using the at least one environmental sensor.

21. The system of claim 20, wherein the first environmental sensor unit further comprises an environmentally-sealed case in which the at least one wireless transceiver, the at least one second processor, and the at least one second storage medium are disposed.

22. The system of claim 21, wherein:
the first environmental sensor unit further comprises at least one external physical port, the at least one external physical port being communicatively connected to the at least one second processor and comprising an opening disposed on an exterior of the environmentally-sealed case; and
one or more of the at least one environmental sensor are disposed outside of the environmentally-sealed case and connected to the at least one external physical port.

23. The system of claim 22, wherein the apparatus and the first environmental sensor unit further comprise complementary components of a latch to hold the apparatus and first environmental sensor unit in physical proximity to one another.

24. The system of claim 20, wherein:
the at least one second storage medium stores an individual identifier for each of the at least one environmental sensor; and
the second method further comprises:
transmitting, via the at least one wireless transceiver, at least one second wireless transmission to the at least one computing device located remote from the environment, the at least one second wireless transmission comprising the value of the environmental parameter, the device identifier for the first environmental sensor unit, and the individual identifier for an environmental sensor of the at least one environmental sensor via which the value of the environmental parameter was determined.

25. The system of claim 24, wherein:
the second method further comprises, in response to receiving, via the at least one wireless transceiver and from the at least one computing device, a first message indicating that the value of the environmental parameter satisfies an alert condition, transmitting, to the apparatus and via the at least one wireless transceiver, at least one second message comprising the value and indicating an alert;

the method further comprises, in response to receiving, using the wireless receiver of the apparatus, the at least one second message comprising the device identifier for the first environmental sensor unit, determining whether the at least one second message indicates the alert; and controlling the display comprises, in response to determining that the at least one second message indicates the alert, controlling the display to present information indicative of the alert.

26. An environmental monitoring system for monitoring one or more environmental parameters of an environment, the environmental monitoring system comprising:
- at least one computing device located remote from the environment;
- a first environmental sensor unit located in the environment; and
- a display device located in the environment, the display device being separate and distinct from the at least one computing device and the first environmental sensor unit,
- wherein the first environmental sensor unit comprises:
  - at least one environmental sensor;
  - at least one wireless transceiver;
  - at least one first processor; and
  - at least one first storage medium having encoded thereon executable instructions that, when executed by the at least one first processor, cause the at least one first processor to carry out a first method comprising:
    - in response to detecting a value of an environmental parameter via the at least one environmental sensor, transmitting the value to the at least one computing device via the at least one wireless transceiver; and
    - in response to receiving from the at least one computing device a message indicating that the value of the environmental parameter satisfies an alert condition, transmitting, to the display device and via the at least one wireless transceiver, at least one message comprising the value and indicating an alert; and
- wherein the display device comprises:
  - a housing;
  - a display integrated with the housing;
  - a wireless receiver;
  - at least one second processor disposed in the housing;
  - at least one second storage medium disposed in the housing, the at least one second storage medium having encoded thereon executable instructions that, when executed by the at least one second processor, cause the at least one second processor to carry out a second method comprising:
    - in response to receiving, using the wireless receiver of the display device, at least one message from the first environmental sensor unit, determining whether the at least one message indicates the alert;
    - in response to determining that the at least one message indicates the alert, updating the display of the display device to output the value and the alert; and
    - in response to determining that the at least one message does not indicate the alert, updating the display of the display device to output the value.

* * * * *